(12) United States Patent
Baba et al.

(10) Patent No.: US 10,797,540 B2
(45) Date of Patent: Oct. 6, 2020

(54) STATOR, MOTOR, COMPRESSOR, AND REFRIGERATION AIR CONDITIONER

(71) Applicant: Mitsubishi Electric Corporation, Tokyo (JP)

(72) Inventors: Kazuhiko Baba, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 29 days.

(21) Appl. No.: 16/082,574

(22) PCT Filed: May 30, 2016

(86) PCT No.: PCT/JP2016/065874
§ 371 (c)(1),
(2) Date: Sep. 6, 2018

(87) PCT Pub. No.: WO2017/208290
PCT Pub. Date: Dec. 7, 2017

(65) Prior Publication Data
US 2019/0081519 A1 Mar. 14, 2019

(51) Int. Cl.
*H02K 1/18* (2006.01)
*H02K 1/02* (2006.01)
(Continued)

(52) U.S. Cl.
CPC .............. *H02K 1/18* (2013.01); *H02K 1/02* (2013.01); *H02K 1/08* (2013.01); *H02K 1/148* (2013.01);
(Continued)

(58) Field of Classification Search
CPC ............ H02K 1/17; H02K 15/02; H02K 1/02; H02K 1/18; H02K 1/00; H02K 1/04;
(Continued)

(56) References Cited

U.S. PATENT DOCUMENTS

2007/0241622 A1* 10/2007 Toyoda ................ H02K 1/02
310/44
2012/0060547 A1* 3/2012 Fujisue ................ F04B 35/04
62/498
(Continued)

FOREIGN PATENT DOCUMENTS

CN 103999326 A 8/2014
JP 2002-112513 A 4/2002
(Continued)

OTHER PUBLICATIONS

Maekawa Yuji,Tojima Narifumi, Stator Core, Dec. 1, 2011, Ihi Corp, JP 2011244670 (English Machine Translation) (Year: 2011).*
(Continued)

*Primary Examiner* — Quyen P Leung
*Assistant Examiner* — Alexander A Singh
(74) *Attorney, Agent, or Firm* — Posz Law Group, PLC

(57) ABSTRACT

A stator includes a first core and a second core. The first core has a yoke extending in a circumferential direction about an axis line and having a second insertion hole, and a tooth extending from the yoke in a direction toward the axis line and having a first insertion hole. The second core has a first part disposed in the first insertion hole and a second part disposed in the second insertion hole and formed of amorphous metal or nanocrystal metal.

31 Claims, 17 Drawing Sheets

(51) Int. Cl.
   *H02K 1/17* (2006.01)
   *H02K 1/08* (2006.01)
   *H02K 1/14* (2006.01)
   *H02K 3/52* (2006.01)
   *H02K 15/02* (2006.01)
   *H02K 7/14* (2006.01)

(52) U.S. Cl.
   CPC ............... *H02K 1/17* (2013.01); *H02K 1/185* (2013.01); *H02K 3/522* (2013.01); *H02K 15/02* (2013.01); *H02K 7/14* (2013.01)

(58) Field of Classification Search
   CPC .. H02K 1/06; H02K 1/08; H02K 1/10; H02K 1/12; H02K 1/14; H02K 1/141; H02K 1/148; H02K 1/16; H02K 1/165; H02K 3/522; H02K 1/185; H02K 7/14
   USPC .... 310/216.066, 216.001, 216.004, 216.006, 310/216.045, 216.061, 214, 215
   See application file for complete search history.

(56) References Cited

U.S. PATENT DOCUMENTS

| | | | |
|---|---|---|---|
| 2013/0278103 A1* | 10/2013 | McPherson | H02K 1/148 310/154.02 |
| 2014/0312729 A1 | 10/2014 | Kim et al. | |
| 2017/0288476 A1* | 10/2017 | Fischer | H02K 1/02 |

FOREIGN PATENT DOCUMENTS

| | | | |
|---|---|---|---|
| JP | 2004-201429 A | | 7/2004 |
| JP | 2007-312542 A | | 11/2007 |
| JP | 2010-207028 A | | 9/2010 |
| JP | 2010-259246 A | | 11/2010 |
| JP | 2011-024366 A | | 2/2011 |
| JP | 2011147200 A | * | 7/2011 |
| JP | 2011244670 A | * | 12/2011 |
| JP | 2013-546301 A | | 12/2013 |
| JP | 2014-155347 A | | 8/2014 |
| JP | 2015-076973 A | | 4/2015 |
| WO | WO2000072426 | * | 11/2000 |

OTHER PUBLICATIONS

Akita Hiroyuki; Kawaguchi Hitoshi; Kawasaki Sachiko; Oka Keiichiro, Motor Armature, Jul. 28, 2011, Mitsubishi Electric Corp, JP 2011147200 (English Machine Translation) (Year: 2011).*

Enomoto Yuji et al, Core for Rotating Machine, Nov. 30, 2000, Hitachi LTD, WO 0072426 (English Machine Translation) (Year: 2000).*

International Search Report ("ISR") dated Aug. 16, 2016 issued in corresponding international patent application No. PCT/JP2016/065874.

Office Action dated Dec. 18, 2019 issued in corresponding CN patent application No. 201680085791.X (and English translation).

Office Action dated May 21, 2019 issued in corresponding JP patent application No. 2018-520060 (and English translation).

* cited by examiner

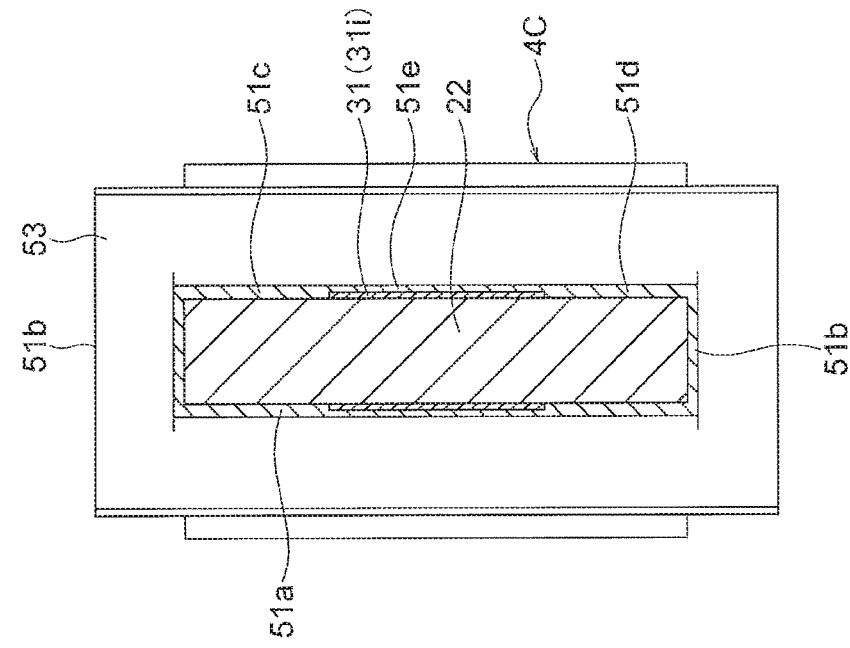
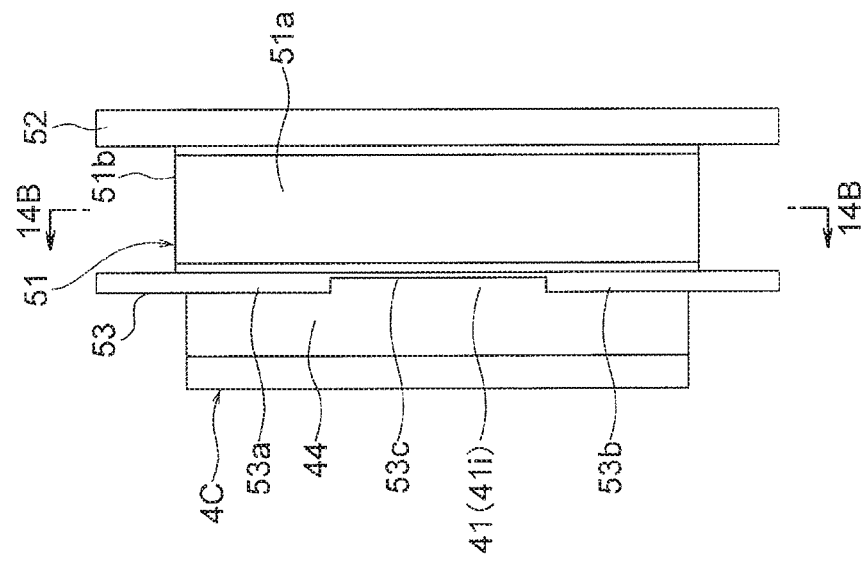

STATOR, MOTOR, COMPRESSOR, AND REFRIGERATION AIR CONDITIONER

CROSS REFERENCE TO RELATED APPLICATION

This application is a U.S. national stage application of International Patent Application No. PCT/JP2016/065874 filed on May 30, 2016, the disclosure of which is incorporated herein by reference.

TECHNICAL FIELD

The present invention relates to a stator, a motor, a compressor and a refrigeration air conditioner.

BACKGROUND ART

In order to reduce iron loss in a motor, there has been developed a stator core formed of amorphous metal or nanocrystal metal having lower iron loss than electromagnetic steel sheets (Patent Reference 1). Further, there have been developed a stator core formed by combining two types of electromagnetic steel sheets having different rolling directions (Patent Reference 2) and a stator core having holes filled with magnetic material (Patent Reference 3).

PATENT REFERENCE

Patent Reference 1: Japanese Patent Application Publication No. 2013-546301 (see FIG. 1)
Patent Reference 2: Japanese Patent Application Publication No. 2010-207028 (see FIG. 6)
Patent Reference 3: Japanese Patent Application Publication No. 2011-24366 (see FIG. 2)

In order to effectively reduce the iron loss, the stator core is most preferably formed of amorphous metal or nanocrystal metal as in the Patent Reference 1. However, amorphous metal and nanocrystal metal have characteristics such that magnetic resistance increases when compressive stress is applied. Thus, if the stator core is formed of amorphous metal or nanocrystal metal, the magnetic resistance may increase when the stator core is fitted in a frame by means of shrink fitting or the like and receives compressive stress. This may cause an increase in iron loss.

SUMMARY

The present invention is made to resolve the above described problem, and an object of the present invention is to provide a stator employing amorphous metal or nanocrystal metal and being capable of inhibiting an increase in magnetic resistance in response to compressive stress.

A stator according to the present invention comprises a first core having an insertion hole and a second core disposed in the insertion hole and formed of amorphous metal or nanocrystal metal.

According to the present invention, the second core formed of amorphous metal or nanocrystal metal is disposed in the insertion hole of the first core, and thus compressive stress is applied mainly to the first core. Accordingly, the compressive stress applied to the second core can be reduced and the increase in magnetic resistance can be inhibited.

BRIEF DESCRIPTION OF THE DRAWINGS

FIGS. 14(A) and 14(B) are a side view and a cross-sectional view showing a configuration example of the insulator.

DETAILED DESCRIPTION

First Embodiment (Configuration of Motor)

Figure 1:
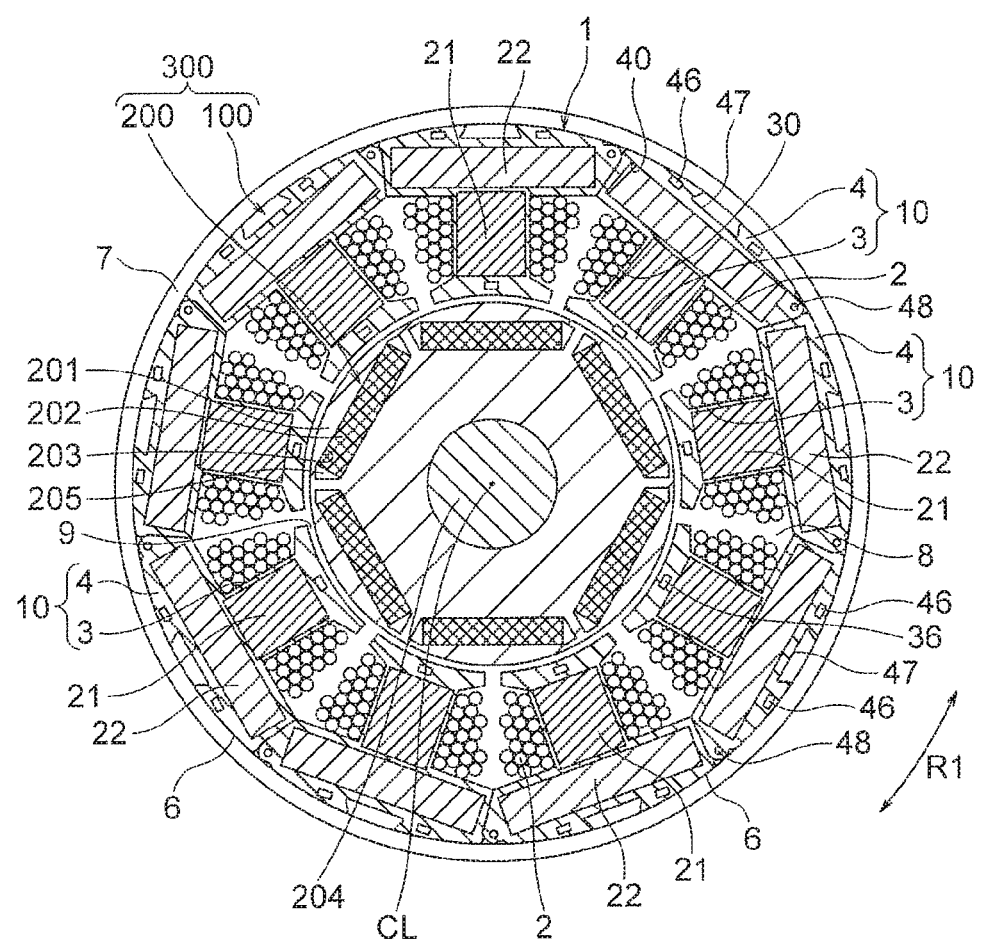
FIG. 1 is a cross-sectional view showing a configuration of a motor in a first embodiment.

A motor 300 according to a first embodiment of the present invention will be described. FIG. 1 is a cross-sectional view showing a configuration of the motor 300 in the first embodiment of the present invention. This motor 300 is a permanent magnet embedded motor including permanent magnets 202 embedded in a rotor 200, and is employed for a rotary compressor 500 (see FIG. 16), for example. Incidentally, FIG. 1 is a cross-sectional view in a plane perpendicular to a rotation axis (axis line CL) of the rotor 200.

The motor 300 is a motor of a so-called inner rotor type and includes a stator 100 and the rotor 200 rotatably provided inside the stator 100. An air gap 9 of, for example, 0.3 to 1.0 mm is formed between the stator 100 and the rotor 200.

In the following description, a direction of the axis line CL as the rotation axis of the rotor 200 will be referred to simply as an "axial direction". Further, a circumferential direction about the axis line CL will be referred to simply as a "circumferential direction". Further, a radial direction of the stator 100 and the rotor 200 about the axis line CL will be referred to simply as a "radial direction". In FIGS. 2 to 5 and 7 to 13 which will be described later, an arrow CL represents the axial direction and an arrow R1 represents the circumferential direction.

The stator 100 includes a stator core 1 and windings 2 wound around the stator core 1. The stator core 1 includes a first core 10 formed of electromagnetic steel sheets and second cores 21 and 22 formed of amorphous metal or nanocrystal metal.

The first core 10 include a yoke 4 having a ring shape about the aforementioned axis line CL and a plurality of teeth 3 each extending inward in the radial direction (i.e., in a direction toward the axis line CL) from the yoke 4. While nine teeth 3 are arranged at constant intervals in the circumferential direction in this example, the number of teeth 3 may be any number greater than or equal to two. A slot 8 as a space accommodating the windings 2 is formed between teeth 3 adjacent to each other in the circumferential direction.

The stator core 1 has a configuration in which a plurality of (nine in this example) split cores 6 (FIG. 4), each including a tooth 3, are connected together in the circumferential direction. The split cores 6 are connected to each other at connection parts 48 provided at ends of the yoke 4 in the circumferential direction. With this configuration, the plurality of split cores 6 can be spread into a band shape, and then combined into a ring shape.

The winding 2 for generating a rotating magnetic field is formed by, for example, winding a magnet wire around the tooth 3 via an insulator 5 (FIG. 13) which will be described later. The number of turns of the winding 2 and a diameter (wire diameter) of the winding 2 are determined according to required characteristics (rotation speed, torque, or the like), an applied voltage, and a cross-sectional area of the slot 8. The winding 2 is wound by means of concentrated winding and is connected by means of Y connection. Incidentally, the insulators 5 are not shown in FIG. 1.

The winding 2 is wound in a state where the aforementioned plurality of split cores 6 are spread in a band shape. The magnet wire having a diameter of 1.0 mm, for example, is wound around each tooth 3 for 80 turns, for example, and thereafter the plurality of split cores 6 are bent into a ring shape and both ends of the split cores 6 are welded together.

The first core 10 is mounted in a cylindrical frame 7 of the motor 300 by means of shrink fitting, press fitting, welding or the like. This frame 7 is a part of a hermetic container of the rotary compressor 500 (FIG. 16), for example. The second cores 21 and 22 are disposed in insertion holes 30 and 40 (described later) formed in the first core 10.

The rotor 200 includes a rotor core 201 in a cylindrical shape, permanent magnets 202 mounted in the rotor core 201, and a shaft 204 disposed at a central part of the rotor core 201. The shaft 204 is a shaft of the rotary compressor 500 (FIG. 16), for example. The rotor core 201 is formed by stacking electromagnetic steel sheets, each of which has a thickness of 0.1 mm to 0.7 mm, in the axial direction and fastening the electromagnetic steel sheets together by means of crimping.

A plurality of (six in this example) magnet insertion holes 203 to which the permanent magnets 202 are inserted are formed along an outer circumferential surface of the rotor core 201. The magnet insertion holes 203 are through holes penetrating the rotor core 201 in the axial direction. The number of the magnet insertion holes 203 (i.e., number of magnetic poles) is not limited to six, but may be any number greater than or equal to two. A part between adjacent magnet insertion holes 203 is an inter-pole part.

The permanent magnet 202 is a flat plate-like member elongated in the axial direction, and has a width in the circumferential direction of the rotor core 201 and a thickness in the radial direction. The thickness of the permanent magnet 202 is 2 mm, for example. The permanent magnet 202 is formed of a rare-earth magnet containing neodymium (Nd), iron (Fe) and boron (B) as principal components, for example. The permanent magnet 202 is magnetized in its thickness direction.

While one permanent magnet 202 is disposed in each magnet insertion hole 203 in this example, a plurality of permanent magnets 202 may be disposed in each magnet insertion hole 203 and arranged with each other in the circumferential direction. In this case, the plurality of permanent magnets 202 in the same magnet insertion hole 203 are magnetized so that the same poles face outward in the radial direction.

A flux barrier (leakage magnetic flux inhibition hole) 205 is formed at each end of the magnet insertion hole 203 in the circumferential direction. The flux barriers 205 inhibit leakage magnetic flux between adjacent permanent magnets 202. A core part between the flux barrier 205 and the outer circumference of the rotor core 201 is formed as a thin-wall part in order to inhibit a short circuit of magnetic flux between adjacent permanent magnets 202. The thickness of the thin-wall part is preferably the same as a thickness of the electromagnetic steel sheet of the rotor core 201.

(Configuration of First Core)

Figure 2:
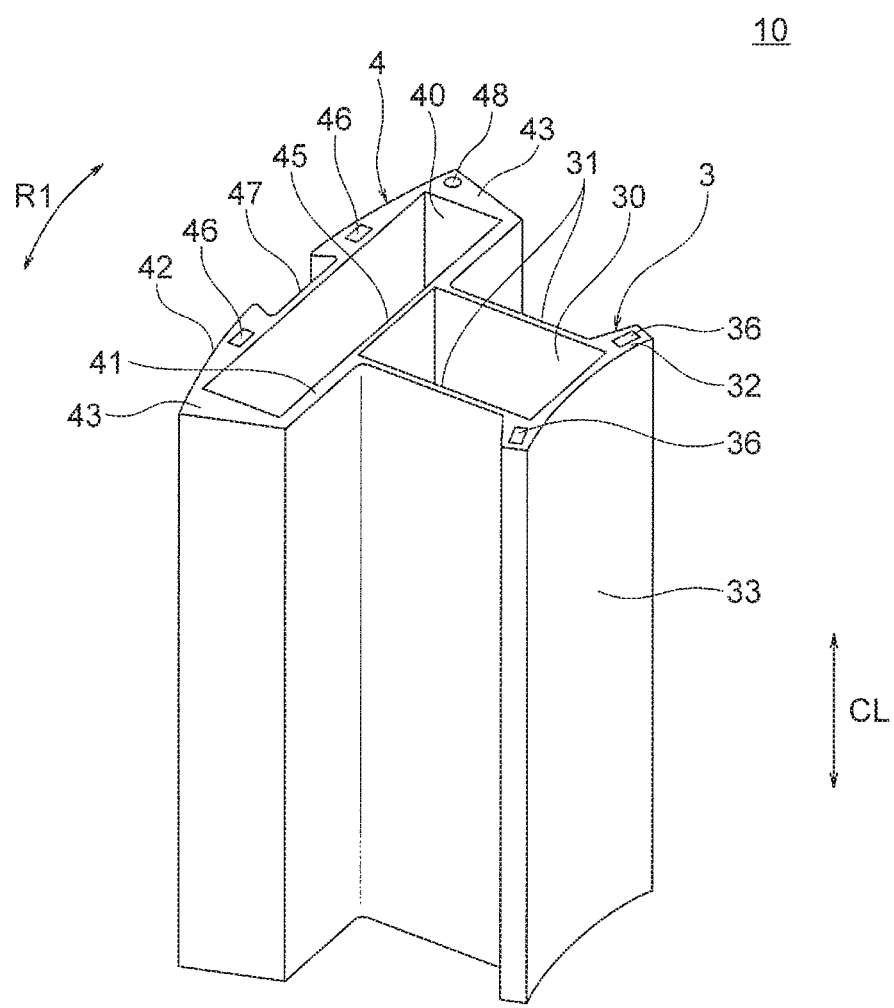
FIG. 2 is a perspective view showing a configuration of a first core of a stator core in the first embodiment.

Next, the first core 10 will be described. FIG. 2 is a perspective view showing a configuration of the first core 10, where the first core 10 included in one split core 6 is shown. The first core 10 is formed of a layered body obtained by stacking electromagnetic steel sheets, each of which has a thickness of 0.2 mm to 0.5 mm, in the axial direction. The electromagnetic steel sheets are non-oriented electromagnetic steel sheets, for example, but are not limited to this example.

As described above, the first core 10 includes the yoke 4 in a ring shape and the tooth 3 extending inward in the radial direction from the yoke 4. Each tooth 3 has a tooth tip part 32 at its inner end in the radial direction, and the tooth tip part 32 has a greater length (width) in the circumferential direction than other parts of the tooth 3. The tooth tip part 32 faces the outer circumferential surface of the rotor 200 (FIG. 1).

A crimping part (tooth crimping part) 36, for fixing the plurality of electromagnetic steel sheets together in the axial direction, is formed in the tooth tip part 32. Incidentally, the crimping part 36 may either be formed at each end of the tooth tip part 32 in the circumferential direction as shown in FIG. 2 or at a center of the tooth tip part 32 in the circumferential direction as shown in FIG. 1.

The tooth 3 has the insertion hole (first insertion hole) 30 as a through hole in the axial direction. In a plane perpendicular to the axial direction, the insertion hole 30 has a rectangular cross-sectional shape in which a length in the radial direction (extending direction of the tooth 3) is longer than a length in the circumferential direction (width direction of the tooth 3). However, the cross-sectional shape of the insertion hole 30 is not limited to a rectangular shape, but may be an elliptical shape, for example.

The tooth 3 has a pair of side walls 31, as thin-wall parts, on both sides of the insertion hole 30 in the circumferential direction. The thickness of the side wall 31 is preferably as thin as possible within a range in which sufficient strength can be secured, and for example, preferably in a range of 0.2 mm to 1 mm. The tooth 3 also has an inner circumferential wall 33 on an inner side (rotor 200 side) of the insertion hole 30 in the radial direction.

The yoke 4 is connected to the tooth 3 at a central part (yoke central part 47) in the circumferential direction and extends from the yoke central part 47 toward both sides in the circumferential direction. The yoke 4 has the insertion hole (second insertion hole) 40 as a through hole in the axial direction. In a plane perpendicular to the axial direction, the insertion hole 40 has a rectangular cross-sectional shape in which a length in the circumferential direction (extending direction of the yoke 4) is longer than a length in the radial direction (width direction of the yoke 4). However, the cross-sectional shape of the insertion hole 40 is not limited to a rectangular shape, but may be an elliptical shape, for example.

The yoke 4 has an inner circumferential wall 41 on an inner side of the insertion hole 40 in the radial direction and an outer circumferential wall 42 on an outer side of the insertion hole 40 in the radial direction. The outer circumferential wall 42 is thicker than the inner circumferential wall 41. The yoke 4 also has a pair of side walls 43 on both sides of the insertion hole 40 in the circumferential direction.

A partition wall 45 as a thin-wall part is formed between the insertion hole 40 of the yoke 4 and the insertion hole 30 of the tooth 3. Similarly to the aforementioned side wall 31 of the tooth 3, a thickness of the partition wall 45 is preferably as thin as possible within a range in which sufficient strength can be secured, and for example, preferably in a range of 0.2 mm to 1 mm.

By reducing the thicknesses of the side wall 31 and the partition wall 45, an amount of magnetic flux flowing through the first core 10 can be reduced and an amount of magnetic flux flowing through the second cores 21 and 22 can be increased. With this configuration, iron loss can be reduced as will be described later.

In contrast, the inner circumferential wall 33 of the tooth 3 and the inner circumferential wall 41, the outer circumferential wall 42 and the side walls 43 of the yoke 4 are formed to be thicker than the side walls 31 of the tooth 3 and the partition wall 45, and thus sufficient strength of the stator core 1 is secured.

A cutaway part is formed on an outer circumferential surface of the outer circumferential wall 42 in the yoke central part 47. On each side of the cutaway part in the circumferential direction, a crimping part 46 for fixing the plurality of electromagnetic steel sheets together in the axial direction is formed. Since the plurality of electromagnetic steel sheets are fixed together by the crimping parts 36 of the tooth 3 and the crimping parts 46 of the yoke 4, high dimensional accuracy and high rigidity of the first core 10 (the tooth 3 and the yoke 4) can be obtained.

Further, at one end of the yoke 4 in the circumferential direction, the connection part 48 to be connected to the yoke 4 of the adjacent split core 6 in the circumferential direction is formed. This connection part 48 may be either a support pin or a plastically deformable thin-wall part.

(Configuration of Second Cores)

Figure 3:
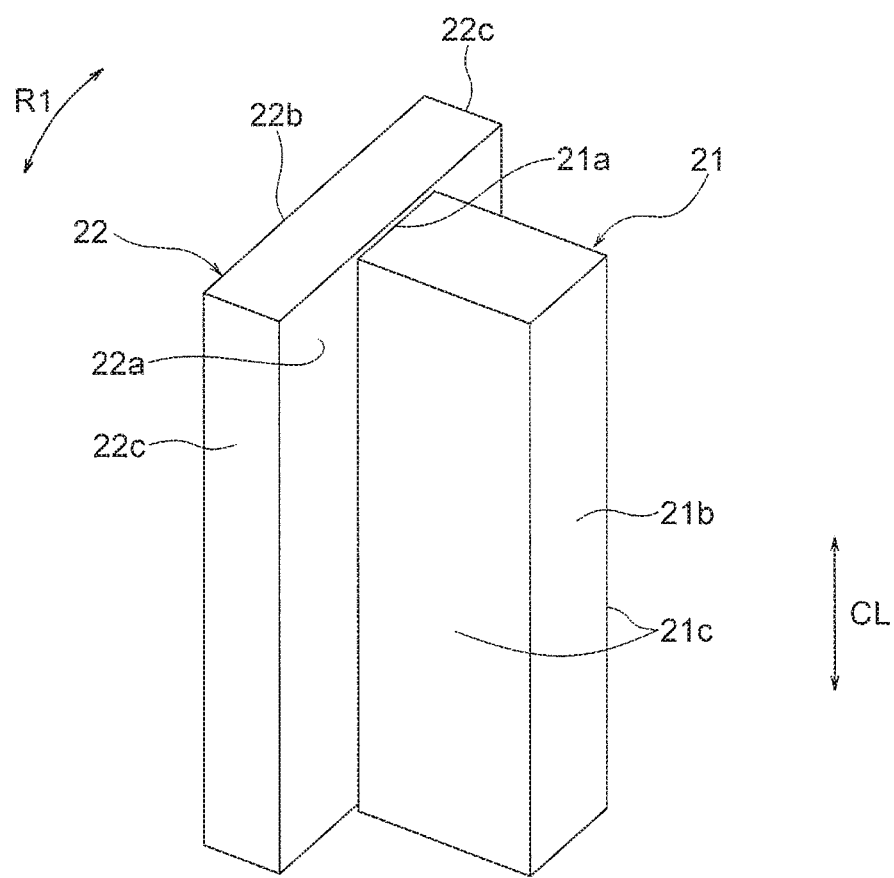
FIG. 3 is a perspective view showing a configuration of second cores of the stator core in the first embodiment.

Next, a configuration of the second cores 21 and 22 will be described. FIG. 3 is a perspective view showing the configuration of the second cores 21 and 22, where the second cores 21 and 22 included in one split core 6 are shown. The second core 21 is a core disposed in the insertion hole 30 of the tooth 3 and may also be referred to as a "first part". The second core 22 is a core disposed in the insertion hole 40 of the yoke 4 and may also referred to as a "second part".

Both of the second cores 21 and 22 are formed of amorphous metal or nanocrystal metal. Further, both of the second cores 21 and 22 are formed of a layered body obtained by stacking thin strips, each of which has a thickness of 0.02 mm to 0.05 mm, in the axial direction, or formed of a molded body obtained by compression molding of powder.

In the case where thin strips formed of amorphous metal or nanocrystal metal are stacked, fixation using crimping parts as in the case of electromagnetic steel sheets is difficult, and thus the thin strips are fixed together by supplying an adhesive agent (resin) to between the thin strips to be stacked. In this case, an effect of inhibiting eddy current loss is also obtained since the adhesive agent exists between the stacked thin strips.

Incidentally, in the case where the second cores 21 and 22 are formed of thin strips of amorphous metal, the second cores 21 and 22 may be annealed in order to remove distortion that occurs in a formation process and to enhance magnetic properties. The annealing of the second cores 21 and 22 may be carried out either before or after insertion into the insertion holes 30 and 40 of the tooth 3 and the yoke 4. By annealing the second cores 21 and 22 after the insertion, the second cores 21 and 22 can be inserted into the insertion holes 30 and 40 before mechanical strength decreases, and thus cracking of the second cores 21 and 22 during insertion can be prevented.

The second core 21 (first part) is disposed in the insertion hole 30 of the tooth 3. The second core 21 has a rectangular prism shape, and in a plane perpendicular to the axial direction, has a rectangular cross-sectional shape in which a length in the radial direction is longer than a length in the circumferential direction. Specifically, the second core 21 has an outer-side end surface 21a on an outer side in the radial direction, an inner-side end surface 21b on an inner side in the radial direction, a pair of side end surfaces 21c on both sides in the circumferential direction, and a pair of end surfaces on both sides in the axial direction. However, the shape of the second core 21 is not limited to a rectangular prism. The second core 21 may have any shape that fits in the insertion hole 30 of the tooth 3.

The second core 22 (second part) is disposed in the insertion hole 40 of the yoke 4. The second core 22 has a rectangular prism shape, and in a plane perpendicular to the axial direction, has a rectangular cross-sectional shape in which a length in the circumferential direction is longer than a length in the radial direction. Specifically, the second core 22 has an inner-side end surface 22a on an inner side in the radial direction, an outer-side end surface 22b on an outer side in the radial direction, a pair of side end surfaces 22c on both sides in the circumferential direction, and a pair of end surfaces on both sides in the axial direction. However, the shape of the second core 22 is not limited to a rectangular prism. The second core 22 may have any shape that fits in the insertion hole 40 of the yoke 4.

As described above, the second cores 21 and 22 are formed of amorphous metal or nanocrystal metal. Amorphous metal is made of atoms being amorphous and having no directivity, and nanocrystal metal is made of crystal grains miniaturized to the order of 10 μm, and thus both of amorphous metal and nanocrystal metal have excellent magnetic properties and low magnetic resistance. Accordingly, the iron loss can be inhibited by disposing the second cores 21 and 22 in regions of the stator core 1 where the magnetic flux from the permanent magnets 202 of the rotor 200 flows the most.

(Configuration and Function of Stator Core)

Figure 4:
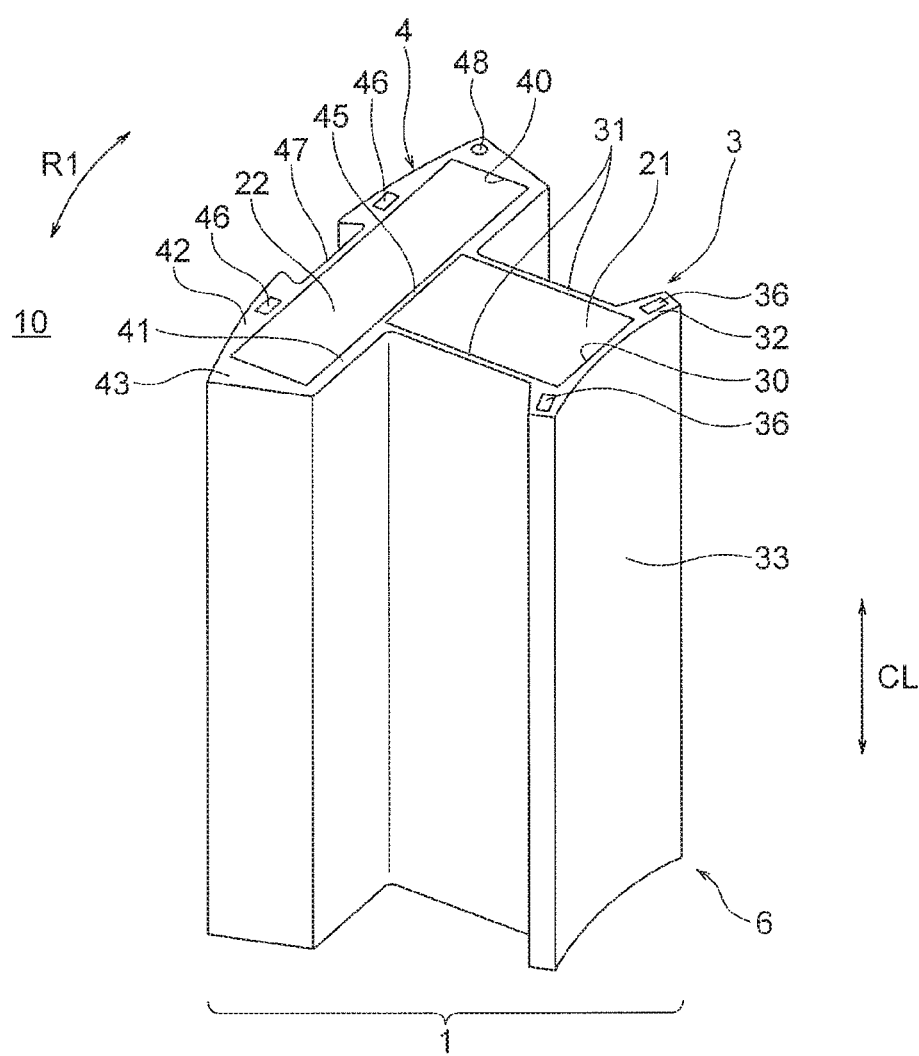
FIG. 4 is a perspective view showing a configuration of the stator core in the first embodiment.

FIG. 4 is a perspective view showing the stator core 1 in which the second cores 21 and 22 are attached to the first core 10. The second core 21 is fitted in the insertion hole 30 of the tooth 3 by means of fitting, such as clearance fit, interference fit or transition fit. Similarly, the second core 22 is fitted in the insertion hole 40 of the yoke 4 by means of fitting, such as clearance fit, interference fit or transition fit.

The magnetic flux from the permanent magnets 202 (FIG. 1) of the rotor 200 flows into the tooth 3 through the tooth tip part 32, flows through the tooth 3 outward in the radial direction, and flows into the yoke 4 through the partition wall 45. The magnetic flux flowing into the yoke 4 flows from the yoke central part 47 toward both sides in the circumferential direction. In this way, paths of the magnetic flux flowing through the tooth 3 and the yoke 4 are formed, and torque for rotating the rotor 200 is generated by interaction between the magnetic flux and an electric current flowing through the winding 2.

In this case, the magnetic flux flowing through the tooth 3 flows through the second core 21 except for the magnetic flux flowing through the side walls 31. Since the second core 21 is formed of amorphous metal or nanocrystal metal and has low magnetic resistance, the iron loss in the tooth 3 can be reduced.

Further, since the side wall 31 is a thin-wall part having a thickness of 0.2 mm to 1 mm, most of the magnetic flux flowing through the tooth 3 flows through the second core 21. Accordingly, the iron loss in the tooth 3 can be further reduced.

Further, the magnetic flux flowing into the yoke 4 changes its direction at the yoke central part 47 and then flows toward both sides in the circumferential direction. In this case, the magnetic flux flowing through the yoke 4 flows through the second core 22 except for the magnetic flux flowing through the inner circumferential wall 41 (the magnetic flux flowing through the outer circumferential wall 42 is very slight). Accordingly, the iron loss in the yoke 4 can be reduced.

Further, while the partition wall 45 is disposed between the second cores 21 and 22, the partition wall 45 is a thin-wall part having a thickness of 0.2 mm to 1 mm, and thus an increase in magnetic resistance due to passage of the magnetic flux through the partition wall 45 can be inhibited.

Further, in the case where the crimping part 36 of the tooth 3 is disposed on each side of the second core 21 in the circumferential direction as shown in FIG. 2, the inner circumferential wall 33 can be made especially thin. With this configuration, the increase in magnetic resistance due to the passage of the magnetic flux through the inner circumferential wall 33 can be inhibited and the iron loss can be reduced.

Here, the amorphous metal or nanocrystal metal forming the second cores 21 and 22 has characteristics such that the magnetic properties deteriorates and the magnetic resistance increases when compressive stress is applied. Further, when the motor 300 is fitted in the frame 7 (FIG. 1) by means of shrink fitting or the like, compressive stress acts on the stator core 1 from the outer circumferential side.

However, the compressive stress applied to the second cores 21 and 22 can be reduced since the second cores 21 and 22 are inserted in the insertion holes 30 and 40 of the first core 10 (i.e., the second cores 21 and 22 are surrounded by the first core 10 from outside). Accordingly, the increase in magnetic resistance of the second cores 21 and 22 due to the compressive stress can be inhibited.

Further, in the case where the second cores 21 and 22 are formed of thin strips of amorphous metal and annealed as described above, mechanical strength of the second cores 21 and 22 may decrease and the second cores 21 and 22 may be damaged. However, in this first embodiment, the second cores 21 and 22 are surrounded by the first core 10 from outside, and therefore the damage can be inhibited even in the case where the second cores 21 and 22 are annealed.

In the first core 10, the inner circumferential wall 33 of the tooth 3 and the inner circumferential wall 41, the outer circumferential wall 42 and the side walls 43 of the yoke 4 are relatively thick, but their influence on the iron loss is slight since these walls are located outside a region through which the magnetic flux flows the most. Since the compressive stress is received by these walls 33, 41, 42 and 43, the compressive stress applied to the second cores 21 and 22 can be reduced.

Effect of Embodiment

As described above, according to the first embodiment of the present invention, the second cores 21 and 22 formed of amorphous metal or nanocrystal metal are disposed in the insertion holes 30 and 40 of the first core 10. Accordingly, the magnetic flux flowing from the permanent magnets 202 into the first core 10 can be made to flow through the second cores 21 and 22 and the iron loss can be reduced. Further, the compressive stress applied to the second cores 21 and 22 can be reduced, and the increase in magnetic resistance of the second cores 21 and 22 due to the compressive stress can be inhibited.

Further, since the second core 21 is disposed in the insertion hole 30 of the tooth 3 and the second core 22 is disposed in the insertion hole 40 of the yoke 4, most of the magnetic flux from the permanent magnets 202 flows through the second cores 21 and 22. Accordingly, the iron loss can be reduced effectively.

Further, since the insertion hole 30 of the tooth 3 has a shape elongated in the radial direction and the insertion hole 40 of the yoke 4 has a shape elongated in the circumferential direction, the second core 21 can be disposed along the flux path in the tooth 3 and the second core 22 can be disposed along the flux path in the yoke 4. Accordingly, the iron loss can be reduced effectively. Particularly, since the second cores 21 and 22 have quadrangular cross-sectional shapes in a plane perpendicular to the axial direction, manufacturing of the second cores 21 and 22 is facilitated and manufacturing cost can be reduced.

Further, since the tooth 3 has the side walls 31 on both sides of the insertion hole 30 in the circumferential direction and the yoke 4 has the inner circumferential wall 41 and the outer circumferential wall 42 on both sides of the insertion hole 40 in the radial direction, sufficient strength of the tooth 3 and the yoke 4 can be secured while reducing the iron loss.

Further, since the partition wall 45 is formed between the insertion hole 30 of the tooth 3 and the insertion hole 40 of the yoke 4, the second cores 21 and 22 having, for example, rectangular prism shapes can be disposed so as to face each other via the partition wall 45.

Further, since the first core 10 is formed of a layered body obtained by stacking a plurality of electromagnetic steel sheets, the strength of the stator core 1 can be increased. Further, since the tooth 3 and the yoke 4 respectively have the crimping parts 36 and 46 fixing the plurality of electromagnetic steel sheets together, the plurality of electromagnetic steel sheets can be firmly integrated.

Further, since each of the second cores 21 and 22 is formed of a layered body obtained by stacking a plurality of thin strips or formed of a molded body obtained by compression molding of powder, the manufacturing of the second cores 21 and 22 is facilitated. Further, by providing an adhesive agent between the plurality of thin strips, each of the second cores 21 and 22 can be firmly integrated and eddy current loss can be reduced. Further, by annealing the thin strips of amorphous metal, distortion that occurs in the formation process can be removed and the magnetic properties can be enhanced.

Second Embodiment

Figure 5:
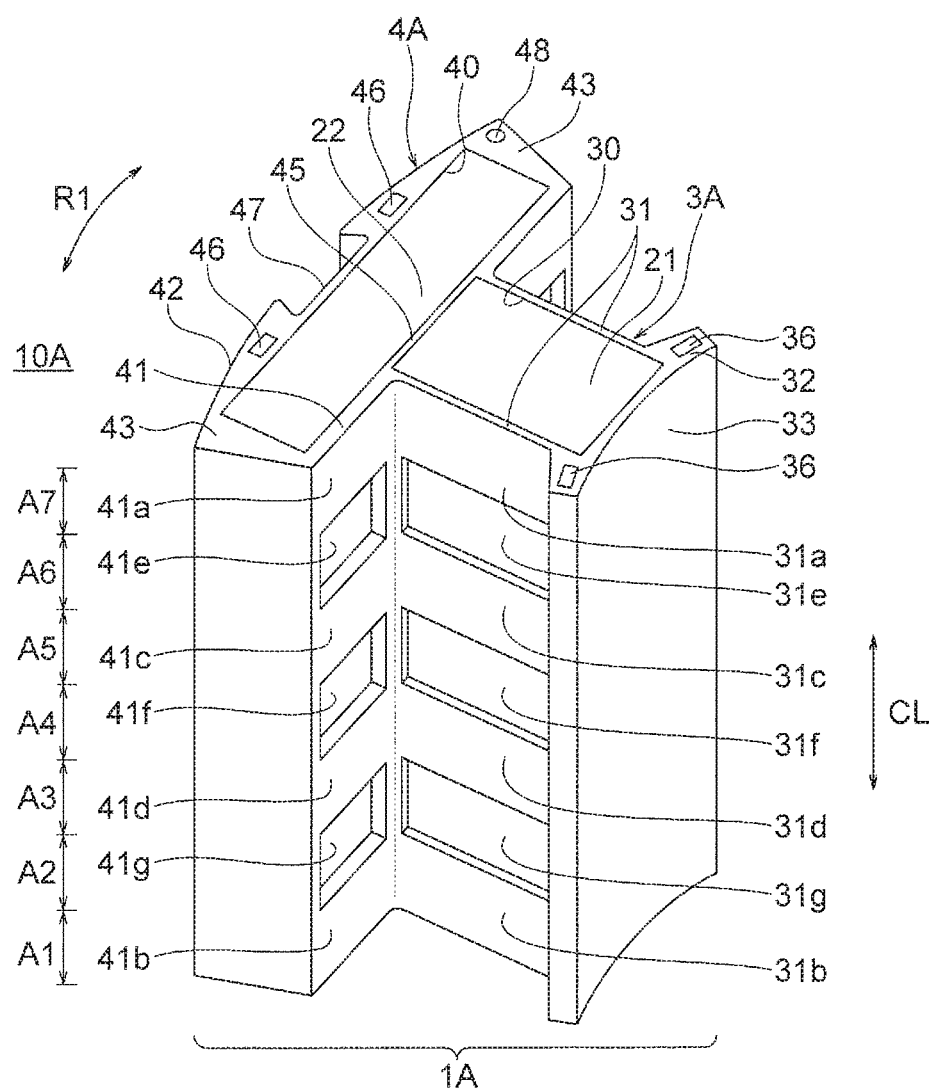
FIG. 5 is a perspective view showing a configuration of a stator core in a second embodiment.

Next, a second embodiment of the present invention will be described. FIG. 5 is a perspective view showing a stator core 1A in the second embodiment, where a part constituting one split core is shown. This second embodiment differs from the first embodiment in shapes of side walls 31 of a tooth 3A and an inner circumferential wall 41 of a yoke 4A.

As shown in FIG. 5, the stator core 1A in the second embodiment includes a first core 10A having the teeth 3A and the yoke 4A and second cores 21 and 22 disposed in the insertion holes 30 and 40 of the tooth 3A and the yoke 4A.

Each side wall 31 of the tooth 3A includes a side wall part 31a located at an end in the axial direction and a side wall part 31b located at the other end in the axial direction. Between the side wall parts 31a and 31b in the axial direction, a side wall part 31c and a side wall part 31d are formed in this order from the side wall part 31a side.

The side wall parts 31a, 31b, 31c and 31d are thin-wall parts of 0.2 mm to 1.0 mm in thickness, have the same width (length in the axial direction) as each other, and extend in parallel with each other. An opening part 31e is formed between the side wall parts 31a and 31c, an opening part 31f is formed between the side wall parts 31c and 31d, and an opening part 31g is formed between the side wall parts 31d and 31b. The opening parts 31e, 31f and 31g have the same width as each other and extend in parallel with each other.

Further, the inner circumferential wall 41 of the yoke 4A includes an inner circumferential wall part 41a located at an end in the axial direction and an inner circumferential wall part 41b located at the other end in the axial direction. Between the inner circumferential wall parts 41a and 41b in the axial direction, an inner circumferential wall part 41c and an inner circumferential wall part 41d are formed in this order from the inner circumferential wall part 41a side.

The inner circumferential wall parts 41a, 41b, 41c and 41d have the same width (length in the axial direction) as each other and extend in parallel with each other. An opening part 41e is formed between the inner circumferential wall parts 41a and 41c, an opening part 41f is formed between the inner circumferential wall parts 41c and 41d, and an opening part 41g is formed between the inner circumferential wall parts 41d and 41b. The opening parts 41e, 41f and 41g have the same width as each other and extend in parallel with each other.

Figure 6A:
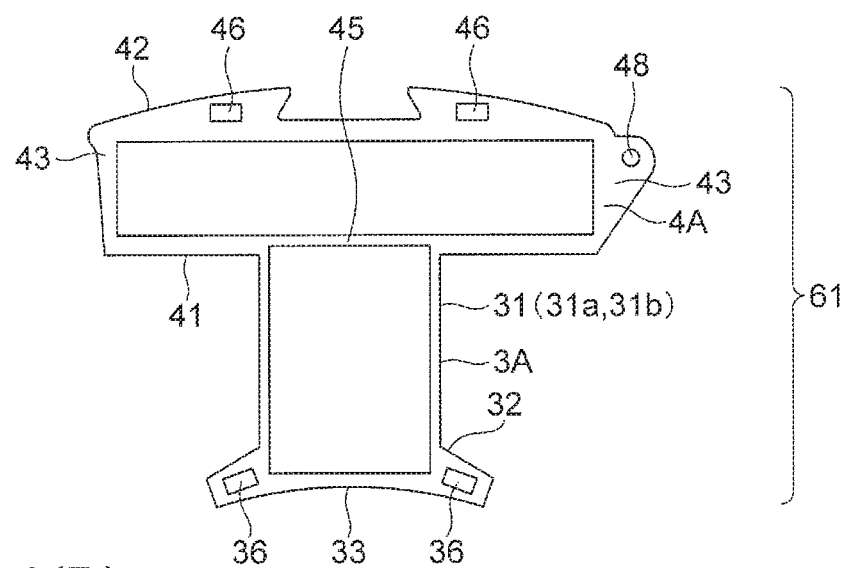
FIG. 6(A) is a plan view showing a first electromagnetic steel sheet and FIG. 6(B) is a plan view showing a second electromagnetic steel sheet both of which are used for manufacturing a first core in the second embodiment.
Figure 6B:
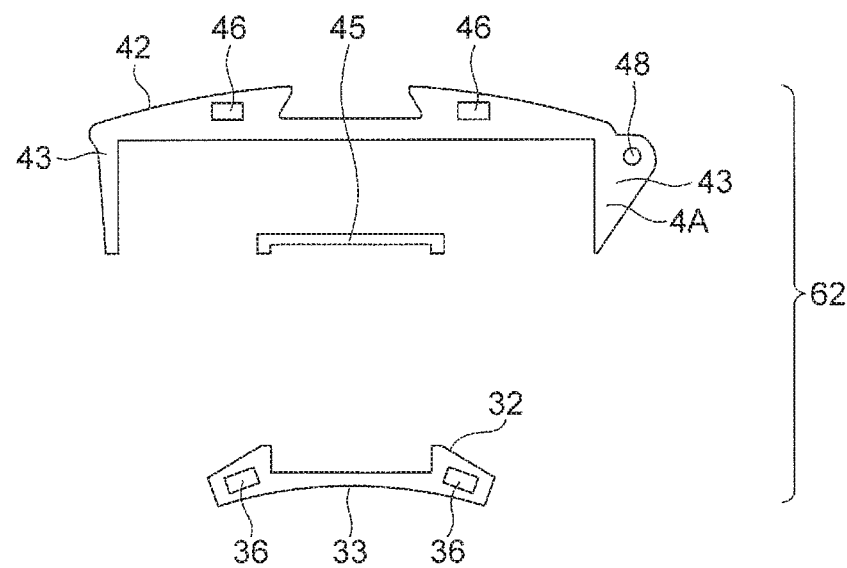

At the time of manufacturing the first core 10A, first electromagnetic steel sheets 61 shown in FIG. 6(A) and second electromagnetic steel sheets 62 shown in FIG. 6(B) are stacked together. Incidentally, each of FIGS. 6(A) and 6(B) shows a part of ring-shaped electromagnetic steel sheets corresponding to one split core 6.

The first electromagnetic steel sheet 61 shown in FIG. 6(A) includes the yoke 4A and the tooth 3A having the side walls 31 (the side wall parts 31a or the side wall parts 31b) and a tooth tip part 32 (including an inner circumferential wall 33). Incidentally, the first core 10 (FIG. 2) in the first embodiment described above is formed by stacking exclusively the first electromagnetic steel sheets 61 in the axial direction.

The second electromagnetic steel sheet 62 shown in FIG. 6(B) includes the yoke 4A and the tooth tip part 32 (including the inner circumferential wall 33) of the tooth 3A. Since the side walls 31 of the tooth 3A do not exist, the tooth tip part 32 and the yoke 4A are separate from each other. However, the stacked tooth tip parts 32 are fixed together by crimping parts 36. Similarly, the stacked sheets of the yoke 4A are fixed together by crimping parts 46.

At the time of forming the first core 10A, the A1 number (FIG. 5) of first electromagnetic steel sheets 61 are stacked, and the A2 number of second electromagnetic steel sheets 62 are stacked thereon. In addition, the A3 number of first electromagnetic steel sheets 61 are stacked, and the A4 number of second electromagnetic steel sheets 62 are stacked thereon. In addition, the A5 number of first electromagnetic steel sheets 61 are stacked, the A6 number of second electromagnetic steel sheets 62 are stacked, and the A7 number of the first electromagnetic steel sheets 61 are stacked thereon. While the numbers A1 to A7 are the same in this example, the numbers A1 to A7 may differ from each other.

Thus, the first core 10A having the opening parts 31e, 31f and 31g in the side walls 31 of the tooth 3A and having the opening parts 41e, 41f and 41g in the inner circumferential wall 41 of the yoke 4A is formed.

Incidentally, while the side wall 31 of the tooth 3A has four side wall parts 31a to 31d in the axial direction and the inner circumferential wall 41 of the yoke 4A has four inner circumferential wall parts 41a to 41d in the axial direction in this example, the number of the side wall parts and the number of the inner circumferential wall parts are not limited to four but may also be two, three, or five or more. Further, the number of side wall parts and the number of inner circumferential wall parts may differ from each other. Further, it is also possible that only the side wall 31 or the inner circumferential wall 41 has the opening parts. Further, the side wall parts 31a to 31d may have widths different from each other and the inner circumferential wall parts 41a to 41d may have widths different from each other.

The configuration of the second cores 21 and 22 are as described in the first embodiment. Incidentally, the side end surfaces 21c of the second core 21 are exposed through the opening parts 31e, 31f and 31g of the tooth 3A. Further, the inner-side end surface 22a of the second core 22 is exposed through the opening parts 41e, 41f and 41g of the yoke 4A.

Most of the magnetic flux flowing from the permanent magnets 202 into the tooth 3A flows through the second core 21, but part of the magnetic flux flows through the side walls 31 of the tooth 3A. Since the side walls 31 of the tooth 3A include the opening parts 31e, 31f and 31g, the amount of the magnetic flux flowing through the side walls 31 of the tooth 3A can be reduced and the amount of the magnetic flux flowing through the second core 21 can be increased.

Further, most of the magnetic flux flowing from the tooth 3A into the yoke 4A flows through the second core 22, but part of the magnetic flux flows through the inner circumferential wall 41 of the yoke 4A. Since the inner circumferential wall 41 of the yoke 4A includes the opening parts 41e, 41f and 41g, the amount of the magnetic flux flowing through the inner circumferential wall 41 of the yoke 4A can be reduced and the amount of the magnetic flux flowing through the second core 22 can be increased.

Incidentally, the side walls 31 of the tooth 3A and the inner circumferential wall 41 of the yoke 4A are covered with the insulator 5 (FIG. 13) which will be described later. While the opening parts 31e to 31g of the side walls 31 and the opening parts 41e to 41g of the inner circumferential wall 41 may be left as spaces, resin may be disposed in the opening parts. For example, the insulator 5 may be provided with convex parts (insulation parts) fitting in the opening parts 31e to 31g and the opening parts 41e to 41g. This makes it possible to firmly hold the second cores 21 and 22, prevent the second cores 21 and 22 from shaking, and inhibit occurrence of vibration and noise.

Further, by covering the whole of the side walls 31 and the inner circumferential wall 41 with the insulator 5, electrical insulation between the first core 10 and the winding 2 can be enhanced in addition to achieving the above effects.

The rest of the configuration of the stator and the configuration of the rotor in the second embodiment are similar to those in the first embodiment. Further, the motor 300 (see FIG. 1) including the stator and the rotor in the second embodiment is employed for the rotary compressor 500 (see FIG. 16), for example.

As described above, in this second embodiment, the side walls 31 of the tooth 3A include the opening parts 31e to 31g (first opening parts) and the inner circumferential wall 41 of the yoke 4A includes the opening parts 41e to 41g (second opening parts), and thus the amount of the magnetic flux flowing through the side walls 31 and the inner circumferential wall 41 can be reduced and the amount of the magnetic flux flowing through the second cores 21 and 22 can be increased. Accordingly, the iron loss can be further reduced.

Further, the side wall parts 31a and 31b are disposed at both ends of the tooth 3A in the axial direction and the inner circumferential wall parts 41a and 41b are disposed at both ends of the yoke 4A in the axial direction, and thus the second cores 21 and 22 can be held in a stable condition.

Furthermore, arranging the insulation parts in the opening parts 31e to 31g of the side walls 31 and the opening parts 41e to 41g of the inner circumferential wall 41 makes it possible to firmly hold the second cores 21 and 22 and inhibit occurrence of vibration and noise.

Incidentally, the second cores 21 and 22 are not limited to amorphous metal or nanocrystal metal, but any material having lower iron loss than the first core 10 may be used. Further, the first core 10 may be formed of any material having higher strength than the second cores 21 and 22.

Third Embodiment

Figure 7:
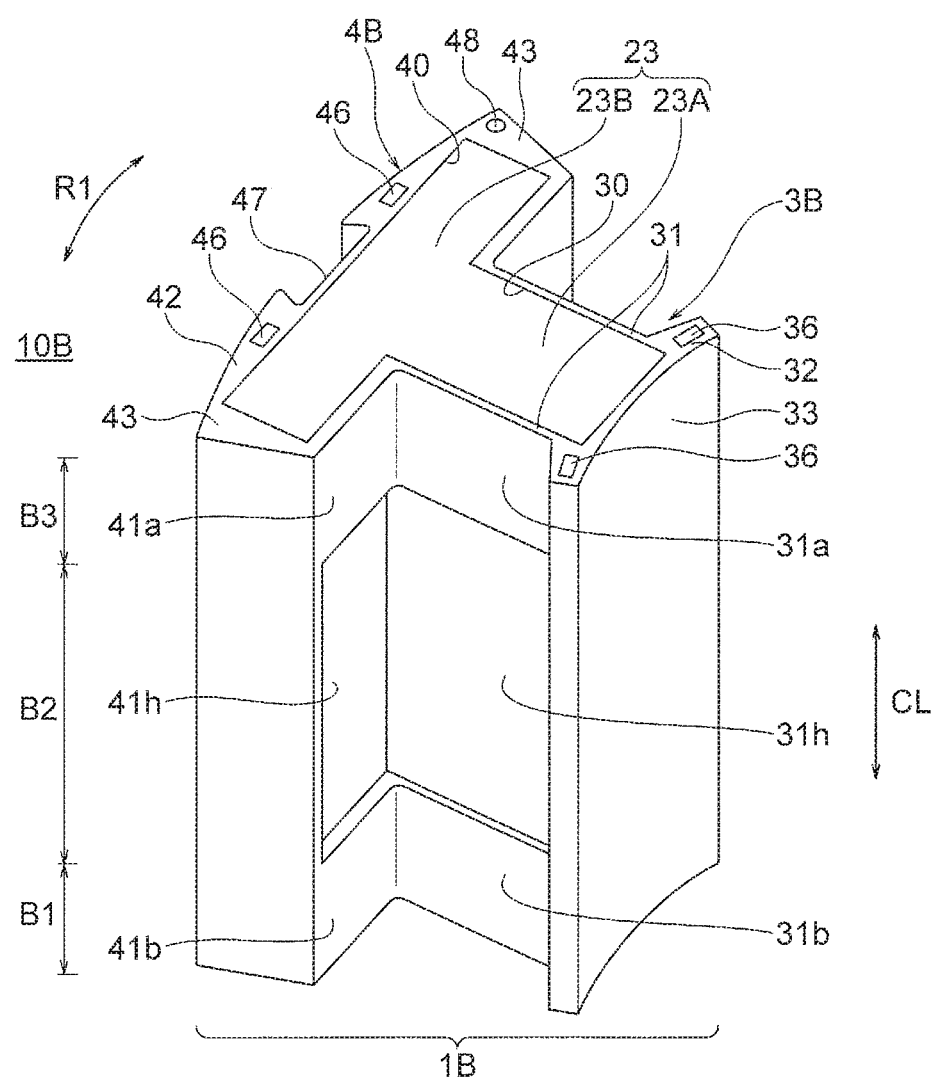
FIG. 7 is a perspective view showing a configuration of a stator core in a third embodiment.

Next, a third embodiment of the present invention will be described. FIG. 7 is a perspective view showing a stator core 1B in the third embodiment, where a part constituting one split core is shown. This third embodiment differs from the first embodiment in that a second core 23 is provided as an integrated body. The third embodiment differs from the first embodiment also in shapes of side walls 31 of a tooth 3B and an inner circumferential wall 41 of a yoke 4B.

As shown in FIG. 7, the stator core 1B in the third embodiment includes a first core 10B having the tooth 3B and the yoke 4B and the second core 23 inserted in the insertion holes 30 and 40 of the tooth 3B and the yoke 4B.

The insertion hole 30 of the tooth 3B and the insertion hole 40 of the yoke 4B are continuous with each other and form one insertion hole in a T-shape as viewed in the axial direction. In this insertion holes 30 and 40, the second core 23 in a T-shape as viewed in the axial direction is inserted. The second core 23 includes a core part 23A inserted in the insertion hole 30 of the tooth 3B and a core part 23B inserted in the insertion hole 40 of the yoke 4B.

The core part 23A has a shape similar to the second core part 21 shown in FIG. 3. However, the length of the core part 23A in the radial direction is longer than that of the second core 21 shown in FIG. 3 by the thickness of the partition wall 45 (FIG. 2) described in the first embodiment. The core part 23B has a shape similar to the second core 22 shown in FIG. 3. The second core 23 (core parts 23A and 23B) is formed of amorphous metal or nanocrystal metal.

Since the core part 23A and the core part 23B are integrated with each other and no partition wall 45 (FIG. 2) exists between the insertion holes 30 and 40 as described above, it is possible to inhibit the increase in magnetic resistance due to passage of magnetic flux through the partition wall 45 when the magnetic flux flows from the core part 23A into the core part 23B.

Each side wall 31 of the tooth 3B includes a side wall part 31a located at an end in the axial direction and a side wall part 31b located at the other end in the axial direction. The side wall parts 31a and 31b are thin-wall parts of 0.2 mm to 1.0 mm in thickness, have the same width (length in the axial direction) as each other in this example, and extend in parallel with each other. However, the side wall parts 31a and 31b may have different widths. An opening part 31h is formed between the side wall parts 31a and 31b. The opening part 31h is arranged at a center of the side wall 31 in the axial direction.

The inner circumferential wall 41 of the yoke 4B includes an inner circumferential wall part 41a located at an end in the axial direction and an inner circumferential wall part 41b located at the other end in the axial direction. The inner circumferential wall parts 41a and 41b have the same width (length in the axial direction) as each other and extend in parallel with each other. However, the inner circumferential wall parts 41a and 41b may have different widths. An opening part 41h is formed between the inner circumferential wall parts 41a and 41b. The opening part 41h is disposed at a center of the inner circumferential wall 41 in the axial direction.

The side walls 31 of the tooth 3B and the inner circumferential wall 41 of the yoke 4B are covered with the insulator 5 (FIG. 13) which will be described later. The opening parts 31h and the opening parts 41h may be left as spaces, or the insulator 5 may be provided with convex parts (insulation parts) fitting in the opening parts 31h and the opening parts 41h.

At the time of manufacturing the first core 10B, the first electromagnetic steel sheets 61 and the second electromagnetic steel sheets 62 described above with reference to FIGS. 6(A) and 6(B) are used while removing the partition wall 45 therefrom. The B1 number of first electromagnetic steel sheets 61 are stacked first, the B2 number of second electromagnetic steel sheets 62 are stacked thereon, and the B3 number of first electromagnetic steel sheets 61 are stacked thereon. In this example, the numbers B1 and B3 are the same as each other, and the number B2 is larger than the numbers B1 and B3. However, these numbers are not limited to this example.

Since the opening part 31h is formed in the side wall 31 of the tooth 3B, the amount of the magnetic flux flowing through the side wall 31 can be reduced and the amount of the magnetic flux flowing through the core part 23A of the second core 23 can be increased. Further, since the opening part 41h is formed in the inner circumferential wall 41 of the yoke 4B, the amount of the magnetic flux flowing through the inner circumferential wall 41 can be reduced and the amount of the magnetic flux flowing through the core part 23B of the second core 23 can be increased.

The rest of the configuration of the stator and the configuration of the rotor in the third embodiment are similar to those in the first embodiment. Further, the motor 300 (see FIG. 1) including the stator and the rotor in the third embodiment is employed for the rotary compressor 500 (see FIG. 16), for example.

As described above, in this third embodiment, the insertion hole 30 of the tooth 3B and the insertion hole 40 of the yoke 4B are formed continuously, and the second core 23 in which the core parts 23A and 23B are integrated is disposed in the continuous insertion hole. Thus, the iron loss can be further reduced.

Further, since the opening part 31h is formed in a central part of the side wall 31 of the tooth 3B in the axial direction and the opening part 41h is formed in a central part of the inner circumferential wall 41 of the yoke 4B in the axial direction, the magnetic flux flowing through the second core 23 (core parts 23A and 23B) can be further increased. Accordingly, the iron loss can be further reduced.

Furthermore, the second core 23 can be held in a stable condition, since the side wall parts 31a and 31b are disposed at both ends of the tooth 3B in the axial direction and the inner circumferential wall parts 41a and 41b are disposed at both ends of the yoke 4B in the axial direction.

Incidentally, the second core 23 is not limited to amorphous metal or nanocrystal metal, but any material having lower iron loss than the first core 10 may be used. Further, the first core 10 may be formed of any material having higher strength than the second core 23.

Fourth Embodiment

Figure 8:
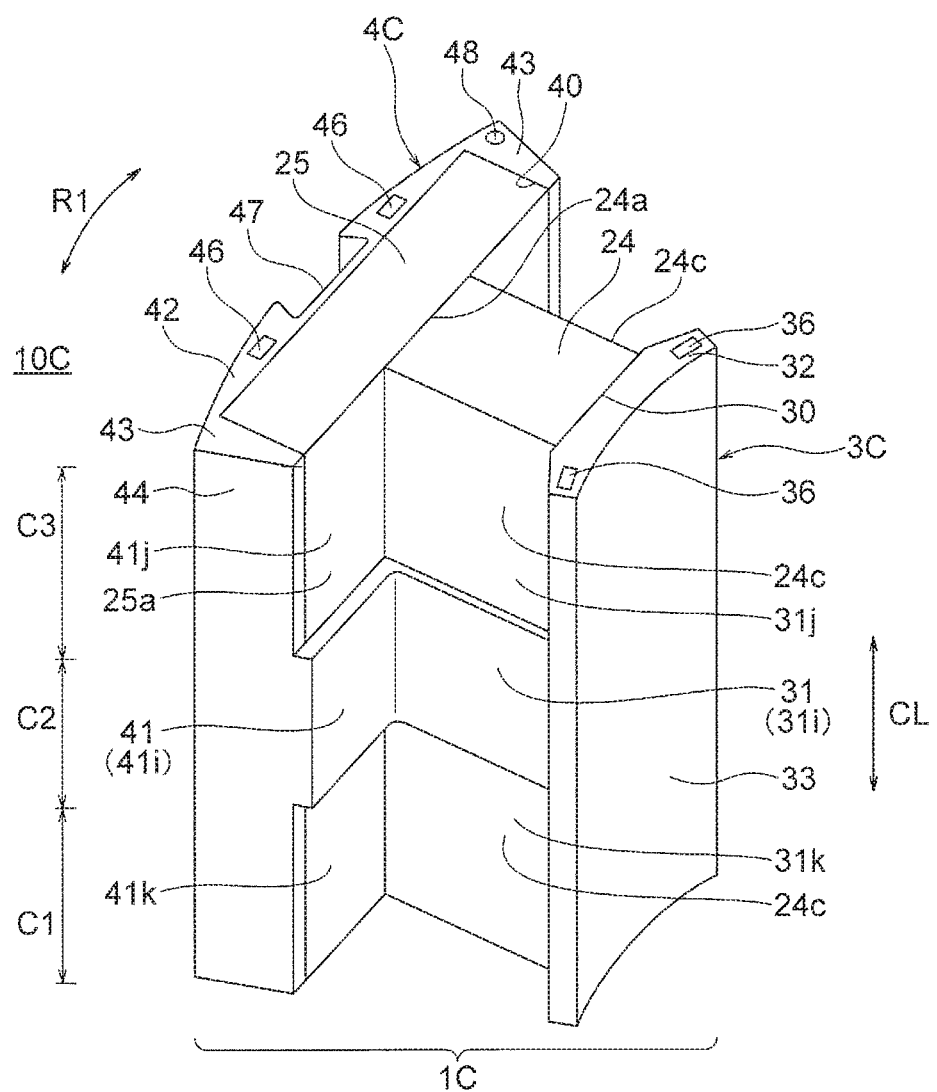
FIG. 8 is a perspective view showing a configuration of a stator core in a fourth embodiment.

Next, a fourth embodiment of the present invention will be described. FIG. 8 is a perspective view showing a stator core 1C in the fourth embodiment, where a part constituting one split core is shown. The fourth embodiment differs from the first embodiment in the shapes of side walls 31 of a tooth 3C and an inner circumferential wall 41 of a yoke 4C. The fourth embodiment differs from the first embodiment also in that second cores 24 and 25 are formed of different materials.

As shown in FIG. 8, the stator core 1C in the fourth embodiment includes a first core 10C having the tooth 3C and the yoke 4C and the second cores 24 and 25 inserted in the insertion holes 30 and 40 of the tooth 3C and the yoke 4C.

The side wall 31 of the tooth 3C includes an opening part 31j located at an end in the axial direction, an opening part 31k located at the other end in the axial direction, and a side wall part 31i formed between the opening parts 31j and 31k. The side wall part 31i is located at a central part of the side wall 31 in the axial direction. The side wall part 31i is a thin-wall part having a thickness of 0.2 mm to 1.0 mm.

The inner circumferential wall 41 of the yoke 4C includes an opening part 41j located at an end in the axial direction, an opening part 41k located at the other end in the axial direction, and an inner circumferential wall part 41i formed between the opening parts 41j and 41k. The inner circumferential wall part 41i is located in a central part of the inner circumferential wall 41 in the axial direction.

The side walls 31 of the tooth 3C and the inner circumferential wall 41 of the yoke 4C are covered with the insulator 5 (FIG. 13) which will be described later. The opening parts 31j and 31k and the opening parts 41j and 41k may be left as spaces, or the insulator 5 may be provided with convex parts (insulation parts) fitting in the opening parts 31j and 31k and the opening parts 41j and 41k.

At the time of manufacturing the first core 10C, the first electromagnetic steel sheets 61 and the second electromagnetic steel sheets 62 described above with reference to FIGS. 6(A) and 6(B) while removing the partition wall 45 therefrom. The C1 number of second electromagnetic steel sheets 62 are stacked first, the C2 number of first electromagnetic steel sheets 61 are stacked thereon, and the C3 number of second electromagnetic steel sheets 62 are stacked thereon. In this example, the numbers C1 and C3 are the same as each other, and the number C2 is smaller than the numbers C1 and C3. However, these numbers are not limited to this example.

The insertion hole 30 of the tooth 3C and the insertion hole 40 of the yoke 4C are formed continuously as described in the third embodiment. The partition wall 45 (FIG. 2) described in the first embodiment is not provided.

In this fourth embodiment, the second core 24 inserted in the insertion hole 30 of the tooth 3C and the second core 25 inserted in the insertion hole 40 of the yoke 4C are formed of materials different from each other. In this example, the second core 24 inserted in the insertion hole 30 of the tooth 3C is formed of amorphous metal or nanocrystal metal. In contrast, the second core 25 inserted in the insertion hole 40 of the yoke 4C is formed of, for example, electromagnetic steel sheets having an easy magnetization direction in the circumferential direction.

The second core 24 has a shape similar to the second core 21 described in the first embodiment, and the second core 25 has a shape similar to the second core 22 described in the first embodiment. However, a length of the second core 24 in the radial direction is longer than that of the second core 21 described in the first embodiment by the thickness of the partition wall 45 (FIG. 2) in the first embodiment.

Electromagnetic steel sheets have higher strength than amorphous metal and nanocrystal metal. Therefore, by arranging the second core 25 formed of electromagnetic steel sheets in the yoke 4C which is more likely to receive the compressive stress than the tooth 3C, the compressive stress applied to the second core 24 in the tooth 3C can be further reduced and the increase in magnetic resistance can be inhibited.

Further, an outer-side end surface 24a of the second core 24 and an inner-side end surface 25a of the second core 25 are in contact with each other. Therefore, the increase in magnetic resistance when the magnetic flux flows from the second core 24 into the second core 25 can be inhibited and the iron loss can be reduced.

Incidentally, while the second cores 24 and 25 separate from each other and formed of different materials are used in this example, it is also possible to employ the integrated second core 23 (FIG. 7) as in the third embodiment instead of the second cores 24 and 25. With this configuration, a boundary part at which the magnetic resistance increases is eliminated from the second core, and thus the iron loss can be further reduced.

It is also possible to increase the strength by providing the partition wall 45 (FIG. 2) described in the first embodiment between the insertion hole 30 of the tooth 3C and the insertion hole 40 of the yoke 4C.

The rest of the configuration of the stator and the configuration of the rotor in the fourth embodiment are similar to those in the first embodiment. The motor 300 (see FIG. 1) including the stator and the rotor in the fourth embodiment is employed for the rotary compressor 500 (see FIG. 16), for example.

As described above, in this fourth embodiment, the opening parts 31*j* and 31*k* are formed at both ends of the side wall 31 of the tooth 3C in the axial direction and the opening parts 41*j* and 41*k* are formed at both ends of the inner circumferential wall 41 of the yoke 4C in the axial direction. With this configuration, the amount of the magnetic flux flowing through the side walls 31 and the inner circumferential wall 41 can be reduced and the amount of the magnetic flux flowing through the second core 24 can be increased. Accordingly, the iron loss can be further reduced.

Further, since the second core 24 disposed in the tooth 3C is formed of amorphous metal or nanocrystal metal and the second core 25 disposed in the yoke 4C is formed of material having higher strength than the second core 24, it is possible to inhibit the iron loss while reducing the compressive stress applied to the second core 24. Furthermore, the iron loss can be further reduced since the second cores 24 and 25 are in contact with each other.

Incidentally, in the first embodiment (FIG. 4) described above, the second core 21 inserted in the insertion hole 30 of the tooth 3 and the second core 22 inserted in the insertion hole 40 of the yoke 4 may be formed of materials different from each other. Further, in the second embodiment (FIG. 5), the second core 21 inserted in the insertion hole 30 of the tooth 3A and the second core 22 inserted in the insertion hole 40 of the yoke 4A may be formed of materials different from each other.

Furthermore, the second core 24 is not limited to amorphous metal or nanocrystal metal, and the second core 25 is also not limited to electromagnetic steel sheets. Any combination of materials may be used as long as the strength of the second core 25 disposed in the yoke 4C is higher than the strength of the second core 24 disposed in the tooth 3C.

Fifth Embodiment

Figure 9:
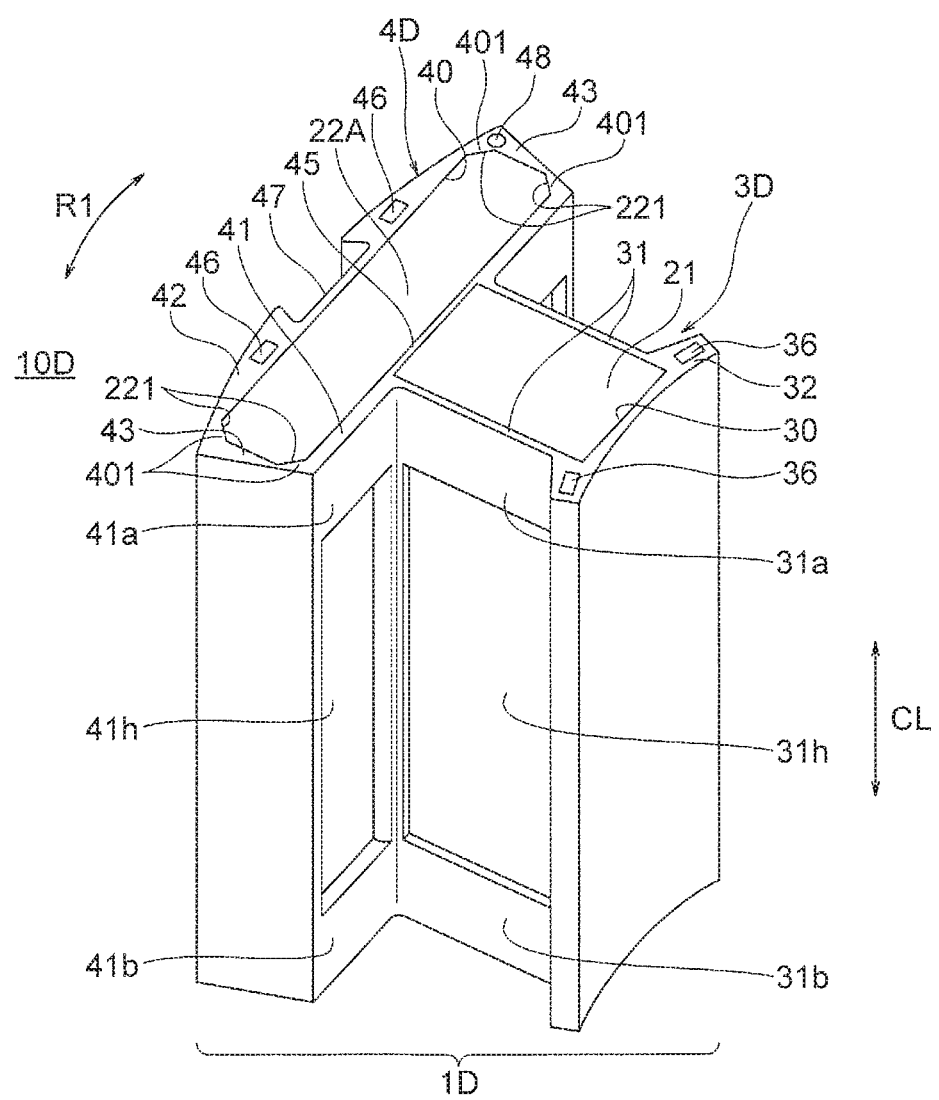
FIG. 9 is a perspective view showing a configuration of a stator core in a fifth embodiment.

Next, a fifth embodiment of the present invention will be described. FIG. 9 is a perspective view showing a stator core 1D in the fifth embodiment, where a part constituting one split core is shown. This fifth embodiment differs from the first embodiment in shape of an insertion hole 40 of a yoke 4D.

As shown in FIG. 9, the stator core 1D in the fifth embodiment includes a first core 10D having a tooth 3D and the yoke 4D and second cores 21 and 22A disposed in the insertion holes 30 and 40 of the tooth 3D and the yoke 4D.

The second core 22A has a quadrangular (for example, rectangular) cross-sectional shape in a plane perpendicular to the axial direction and includes chamfer parts 221 at four corners. The insertion hole 40 of the yoke 4D has inclined surfaces 401 at positions facing the chamfer parts 221 of the second core 22A. The inclined surfaces 401 of the insertion hole 40 are formed to be in contact with the chamfer parts 221 of the second core 22A.

In the fifth embodiment, a partition wall 45 similar to that in the first embodiment is formed between the insertion hole 30 of the tooth 3D and the insertion hole 40 of the yoke 4D. However, instead of providing the partition wall 45, it is also possible to integrate the second cores 21 and 22A, or to arrange the second cores 21 and 22A to be in contact with each other. Further, the second cores 21 and 22A may be formed of materials different from each other.

The side wall 31 of the tooth 3D includes the side wall parts 31*a* and 31*b* at both ends in the axial direction and the opening part 31*h* between the side wall parts 31*a* and 31*b* similarly to the third embodiment. The inner circumferential wall 41 of the yoke 4D includes the inner circumferential wall parts 41*a* and 41*b* at both ends in the axial direction and the opening part 41*h* between the inner circumferential wall parts 41*a* and 41*b* similarly to the third embodiment. The method of stacking the electromagnetic steel sheets is as described in the third embodiment.

However, it is also possible to employ a configuration in which the side walls 31 and the inner circumferential wall 41 have no opening part as in the first embodiment. Further, it is also possible to employ a configuration in which each of the side walls 31 and the inner circumferential wall 41 has a plurality of opening parts as in the second embodiment. Further, it is also possible to employ a configuration in which each of the side walls 31 and the inner circumferential wall 41 has opening parts at both ends in the axial direction as in the fourth embodiment.

The rest of the configuration of the stator and the configuration of the rotor in the fifth embodiment are similar to those in the first embodiment. The motor 300 (see FIG. 1) including the stator and the rotor in the fifth embodiment is employed for the rotary compressor 500 (see FIG. 16), for example.

As described above, in this fifth embodiment, the second core 22A has the chamfer parts 221 at its corner parts and the insertion hole 40 has the inclined surfaces 401 corresponding to the chamfer parts 221, and thus concentration of compressive stress on the corner parts of the second core 22A can be relieved. Accordingly, the compressive stress applied to the second core 22A can be reduced and the increase in magnetic resistance can be inhibited.

Incidentally, the second cores 21 and 22A are not limited to amorphous metal or nanocrystal metal, but any material having lower iron loss than the first core 10D may be used. Further, the first core 10D may be formed of any material having higher strength than the second cores 21 and 22A.

Sixth Embodiment

Figure 10:
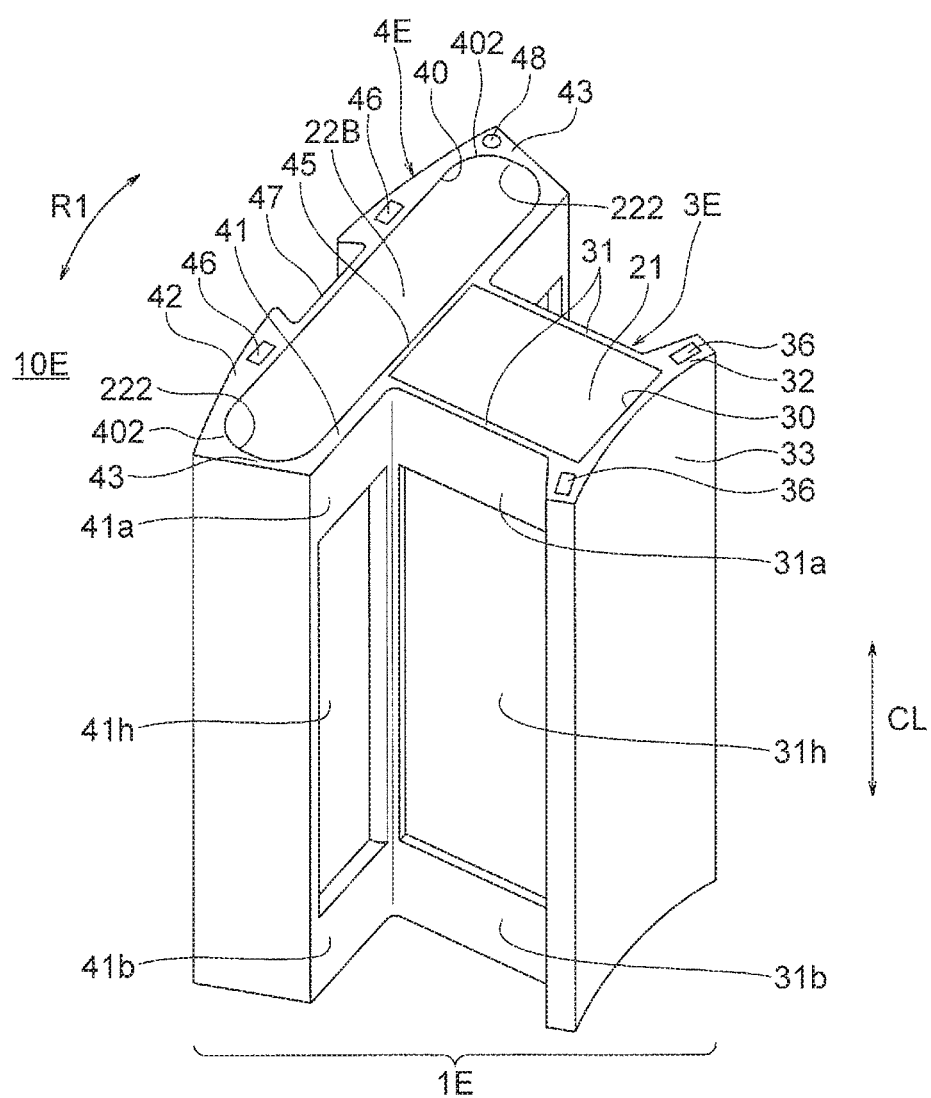
FIG. 10 is a perspective view showing a configuration of a stator core in a sixth embodiment.

Next, a sixth embodiment of the present invention will be described. FIG. 10 is a perspective view showing a stator core 1E in the sixth embodiment, where a part constituting one split core is shown. This sixth embodiment differs from the first embodiment in shape of an insertion hole 40 of a yoke 4E.

As shown in FIG. 10, the stator core 1E in the sixth embodiment includes a first core 10E having a tooth 3E and the yoke 4E and second cores 21 and 22B disposed in the insertion holes 30 and 40 of the tooth 3E and the yoke 4E.

The second core 22B has curved surfaces 222 at both ends in the circumferential direction. Each curved surface 222 is curved to be convex outward in the circumferential direction, and is, for example, a cylindrical surface. The insertion hole 40 of the yoke 4E has curved surfaces 402 at positions facing the curved surfaces 222 of the second core 22B, i.e., at both ends in the circumferential direction. The curved surfaces 402 of the insertion hole 40 are formed to be in contact with the curved surfaces 222 of the second core 22B.

Incidentally, while the curved surface 222 in this example is formed in the whole of each end of the second core 22B in the circumferential direction, it is only necessary that curved surfaces are formed at four corners of the second core 22B. Similarly, it is only necessary that curved surfaces are formed at four corners of the insertion hole 40.

In the sixth embodiment, a partition wall 45 similar to that in the first embodiment is formed between the insertion hole 30 of the tooth 3E and the insertion hole 40 of the yoke 4E. However, instead of providing the partition wall 45, it is also possible to integrate the second cores 21 and 22B, or to dispose the second cores 21 and 22B to be in contact with each other.

The side wall 31 of the tooth 3E includes the side wall parts 31*a* and 31*b* at both ends in the axial direction and the opening part 31*h* is formed between the side wall parts 31*a* and 31*b* similarly to the third embodiment. Further, the inner circumferential wall 41 of the yoke 4E includes the inner circumferential wall parts 41*a* and 41*b* at both ends in the axial direction and the opening part 41*h* is formed between the inner circumferential wall parts 41*a* and 41*b* similarly to the third embodiment. The method of stacking the electromagnetic steel sheets is as described in the third embodiment.

However, it is also possible to employ a configuration in which the side walls 31 and the inner circumferential wall 41 have no opening part as in the first embodiment. Further, it is also possible to employ a configuration in which each of the side walls 31 and the inner circumferential wall 41 has a plurality of opening parts as in the second embodiment. Furthermore, it is also possible to employ a configuration in which each of the side walls 31 and the inner circumferential wall 41 has opening parts at both ends in the axial direction as in the fourth embodiment. Moreover, the second cores 21 and 22B may be formed of materials different from each other.

The rest of the configuration of the stator and the configuration of the rotor in the sixth embodiment are similar to those in the first embodiment. The motor 300 (see FIG. 1) including the stator and the rotor in the sixth embodiment is employed for the rotary compressor 500 (see FIG. 16), for example.

As described above, in this sixth embodiment, the second core 22B of the yoke 4E has the curved surfaces 222 at both ends in the circumferential direction (in parts including the four corners) and the insertion hole 40 have the curved surfaces 402 corresponding to the curved surfaces 222, and thus concentration of compressive stress on the both ends of the second core 22B can be relieved. Accordingly, the compressive stress applied to the second core 22B can be reduced and the increase in magnetic resistance can be inhibited.

Incidentally, the second cores 21 and 22B are not limited to amorphous metal or nanocrystal metal, but any material having lower iron loss than the first core 10 may be used. Further, the first core 10 may be formed of any material having higher strength than the second cores 21 and 22B.

Seventh Embodiment

Figure 11:
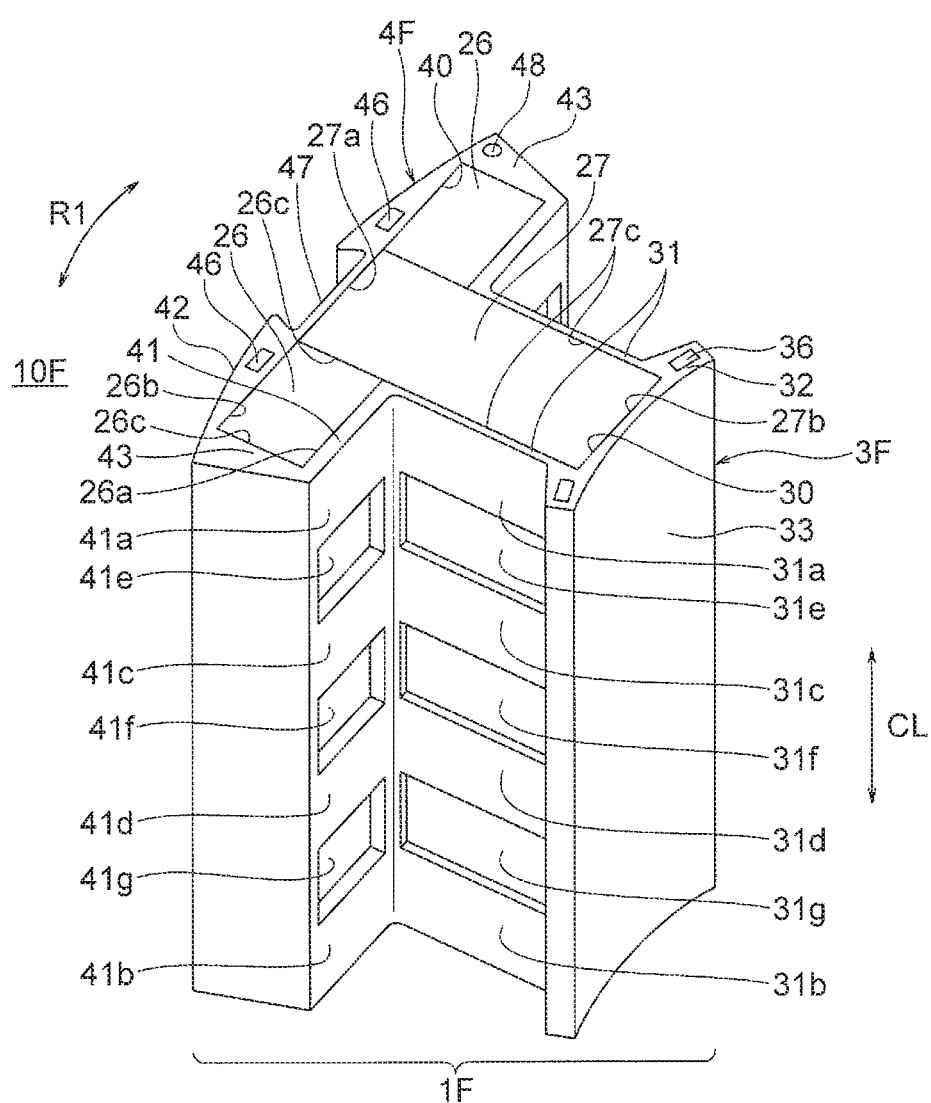
FIG. 11 is a perspective view showing a configuration of a stator core in a seventh embodiment.

Next, a seventh embodiment of the present invention will be described. FIG. 11 is a perspective view showing a stator core 1F in the seventh embodiment, where a part constituting one split core is shown. The seventh embodiment differs from the first embodiment in configuration of second cores 27 and 26.

As shown in FIG. 11, the stator core 1F in the seventh embodiment includes a first core 10F having a tooth 3F and a yoke 4F and the second cores 27 and 26 disposed in the insertion holes 30 and 40 of the tooth 3F and the yoke 4F.

The insertion hole 30 of the tooth 3F and the insertion hole 40 of the yoke 4F are formed continuously with each other similarly to the third embodiment. The second core 27 disposed in the insertion hole 30 of the tooth 3F extends further to enter the insertion hole 40 of the yoke 4F and reach the outer circumferential wall 42. A pair of second cores 26 are disposed in the insertion hole 40 of the yoke 4F, and are located on both sides of the second core 27 in the circumferential direction.

The second core 27 has a rectangular prism shape, and in a plane perpendicular to the axial direction, has a rectangular cross-sectional shape in which a length in the radial direction is longer than a length in the circumferential direction. Specifically, the second core 27 has an outer-side end surface 27*a* on the outer side in the radial direction, an inner-side end surface 27*b* on the inner side in the radial direction, a pair of side end surfaces 27*c* on both sides in the circumferential direction, and a pair of end surfaces on both sides in the axial direction. The outer-side end surface 27*a* of the second core 27 is in contact with the outer circumferential wall 42 of the yoke 4F. The inner-side end surface 27*b* is in contact with the inner circumferential wall 33 of the tooth 3F. Each side end surface 27*c* is in contact with the side wall 31 of the tooth 3F and the second core 26.

Each second core 26 has a rectangular prism shape, and in a plane perpendicular to the axial direction, has a rectangular cross-sectional shape in which a length in the circumferential direction is longer than a length in the radial direction. Specifically, the second core 26 has an inner-side end surface 26*a* on the inner side in the radial direction, an outer-side end surface 26*b* on the outer side in the radial direction, a pair of side end surfaces 26*c* on both sides in the circumferential direction, and a pair of end surfaces on both sides in the axial direction. The outer-side end surface 26*b* is in contact with the outer circumferential wall 42 of the yoke 4F, and the inner-side end surface 26*a* is in contact with the inner circumferential wall 41. The pair of side end surfaces 26*c* are respectively in contact with the side wall 43 of the yoke 4F and the side end surface 27*c* of the second core 27.

The first core 10F is formed of electromagnetic steel sheets, for example, and the second cores 27 and 26 are formed of amorphous metal or nanocrystal metal. However, the second core 27 may be formed of amorphous metal or nanocrystal metal, and the second cores 26 may be formed of material having higher strength (for example, electromagnetic steel sheets). Since the second cores 27 and 26 are in contact with each other at the side end surfaces 27*c* and 26*c*, the magnetic resistance can be reduced.

Each side wall 31 of the tooth 3F has the side wall parts 31*a*, 31*b*, 31*c* and 31*d* and the opening parts 31*e*, 31*f* and 31*g* similarly to the second embodiment. The inner circumferential wall 41 of the yoke 4F has the inner circumferential wall parts 41*a*, 41*b*, 41*c* and 41*d* and the opening parts 41*e*, 41*f* and 41*g* similarly to the second embodiment. The method of stacking the electromagnetic steel sheets is as described in the second embodiment.

However, it is also possible to employ a configuration in which the side walls 31 and the inner circumferential wall 41 have no opening part as in the first embodiment. Further, it is also possible to employ a configuration in which each of the side walls 31 and the inner circumferential wall 41 has a single opening part as in the third embodiment. Furthermore, it is also possible to employ a configuration in which each of the side walls 31 and the inner circumferential wall 41 has opening parts at both ends in the axial direction as in the fourth embodiment.

Further, it is also possible to provide the second cores 26 with the chamfer parts 221 (FIG. 9) and provide the insertion hole 40 with the inclined surfaces 401 (FIG. 9) as in the fifth embodiment. Alternatively, it is also possible to provide the second cores 26 with the curved surfaces 222 (FIG. 10) and provide the insertion hole 40 with the curved surfaces 402

(FIG. 10) as in the sixth embodiment. Further, the second cores 27 and 26 may be formed of materials different from each other as in the fourth embodiment.

The rest of the configuration of the stator and the configuration of the rotor in the seventh embodiment are similar to those in the first embodiment. The motor 300 (see FIG. 1) including the stator and the rotor in the seventh embodiment is employed for the rotary compressor 500 (see FIG. 16), for example.

As described above, in this seventh embodiment, the second cores 27 and 26 are disposed in the insertion hole 40 of the yoke 4F to be in contact with each other. Thus, the magnetic resistance can be reduced and the increase in magnetic resistance can be inhibited, as compared to a case where the first core 10 is provided between the second cores 27 and 26.

Further, the iron loss can be further reduced, since the second core 27 extending from the insertion hole 30 of the tooth 3F to the insertion hole 40 of the yoke 4F are formed of amorphous metal or nanocrystal metal.

Incidentally, the second cores 27 and 26 are not limited to amorphous metal or nanocrystal metal, but any material having lower iron loss than the first core 10F may be used. Further, the first core 10F may be formed of any material having higher strength than the second cores 27 and 26.

Eighth Embodiment

Figure 12:
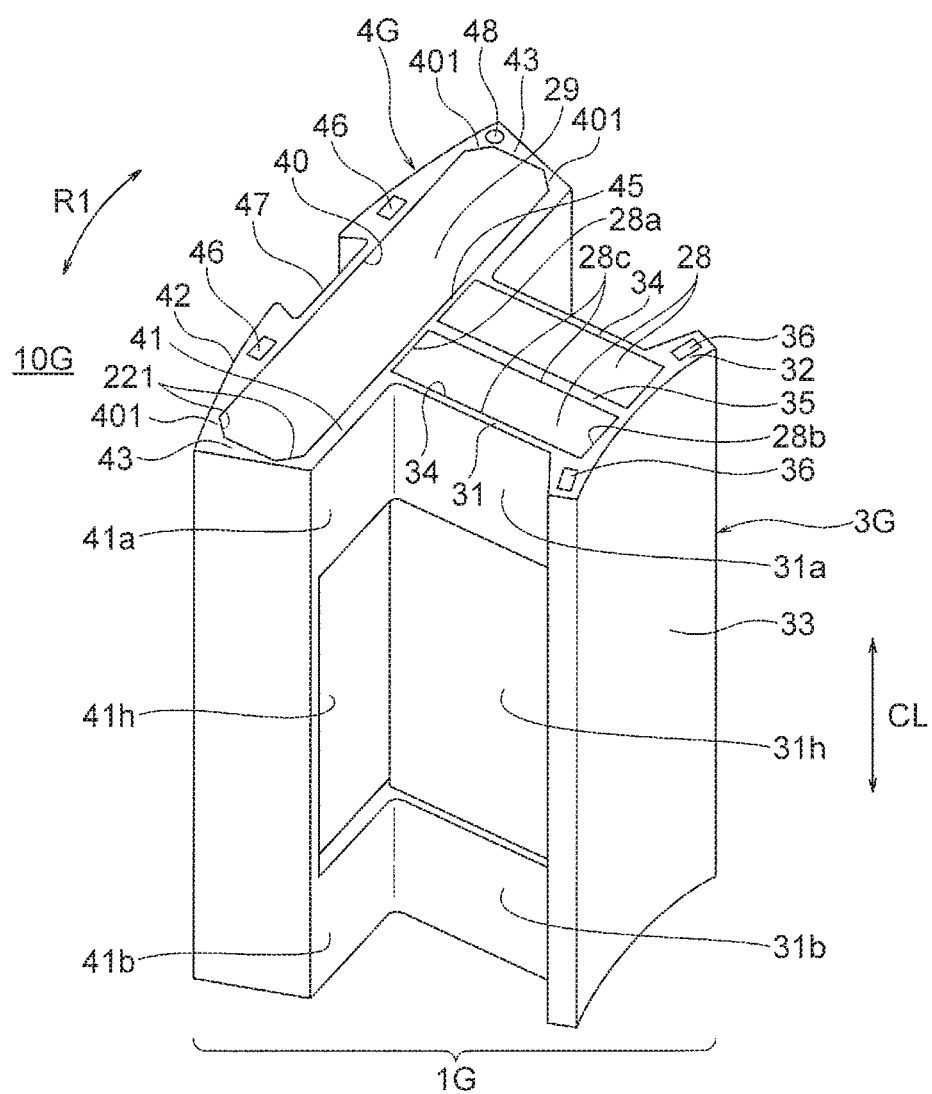
FIG. 12 is a perspective view showing a configuration of a stator core in an eighth embodiment.

Next, an eighth embodiment of the present invention will be described. FIG. 12 is a perspective view showing a stator core 1G in the eighth embodiment, where a part constituting one split core is shown. This eighth embodiment differs from the first embodiment in shape of an insertion hole 30 of a tooth 3G.

As shown in FIG. 12, the stator core 1G in the eighth embodiment includes a first core 10G having the tooth 3G and a yoke 4G and second cores 28 and 29 disposed in insertion holes 34 and 40 of the tooth 3G and the yoke 4G.

In the tooth 3G, two insertion holes 34 are formed to be adjacent to each other in the circumferential direction. The two insertion holes 34 have the same shape as each other. In a plane perpendicular to the axial direction, each insertion hole 34 has a rectangular cross-sectional shape, for example, in which a length in the radial direction is longer than a length in the circumferential direction.

A separation wall 35 separating the two insertion holes 34 from each other is provided at a center of the tooth 3G in the circumferential direction. A partition wall 45 similar to that in the first embodiment is formed between the insertion hole 40 of the yoke 4G and the insertion holes 34. The separation wall 35 is formed in a central part of the tooth 3G in the circumferential direction and extends in the radial direction from the partition wall 45 to the inner circumferential wall 33.

The second core 28 is disposed in each of the insertion holes 34. The second core 28 has a rectangular prism shape, and in a plane perpendicular to the axial direction, has a rectangular cross-sectional shape in which a length in the radial direction is longer than a length in the circumferential direction. Specifically, the second core 28 has an outer-side end surface 28a on the outer side in the radial direction, an inner-side end surface 28b on the inner side in the radial direction, a pair of side end surfaces 28c on both sides in the circumferential direction, and a pair of end surfaces on both sides in the axial direction. The outer-side end surface 28a of the second core 28 is in contact with the partition wall 45. The inner-side end surface 28b is in contact with the inner circumferential wall 33 of the tooth 3G. The pair of side end surfaces 28c are in contact with the side wall 31 and the separation wall 35.

In the tooth 3G in the eighth embodiment, the separation wall 35 is disposed between the two second cores 28, and thus rigidity of the stator core 1G increases. Especially, rigidity against deformation of the teeth 3G in the circumferential direction at the time of driving of the motor 300 (at the time of rotation of the rotor 200) increases, and vibration and noise are inhibited. Incidentally, while each tooth 3G has two second cores 28 arranged in the circumferential direction in this example, each tooth 3G may have three or more second cores 28 arranged in the circumferential direction.

The separation wall 35 is preferably a thin-wall part similar to the side wall 31. Specifically, the thickness of the separation wall 35 is preferably within a range of 0.2 mm to 1 mm, for example. With this configuration, most of the magnetic flux flowing into the tooth 3G flows into the second cores 28, and thus the iron loss can be reduced.

The side wall 31 of the tooth 3G includes the side wall parts 31a and 31b at both ends in the axial direction and the opening part 31h is formed between the side wall parts 31a and 31b similarly to the third embodiment. Further, the inner circumferential wall 41 of the yoke 4G includes the inner circumferential wall parts 41a and 41b at both ends in the axial direction and the opening part 41h is formed between the inner circumferential wall parts 41a and 41b similarly to the third embodiment. The method of stacking the electromagnetic steel sheets is as described in the third embodiment.

However, it is also possible to employ a configuration in which the side walls 31 and the inner circumferential wall 41 have no opening part as in the first embodiment. Further, it is also possible to employ a configuration in which each of the side walls 31 and the inner circumferential wall 41 has a plurality of opening parts as in the second embodiment. Furthermore, it is also possible to employ a configuration in which each of the side walls 31 and the inner circumferential wall 41 has opening parts at both ends in the axial direction as in the fourth embodiment.

The second core 29 in the tooth 3G has the chamfer parts 221 similarly to the second core 22A described in the fifth embodiment. Further, the insertion hole 40 of the yoke 4G has the inclined surfaces 401 at positions facing the chamfer parts 221 of the second core 29. The inclined surfaces 401 of the insertion hole 40 are formed to be in contact with the chamfer parts 221 of the second core 29.

However, it is also possible to provide the second core 29 with no chamfer parts and provide the insertion hole 40 with no inclined surfaces as in the first embodiment. Further, it is also possible to provide the second core 29 with the curved surfaces 222 (FIG. 10) and provide the insertion hole 40 with the curved surfaces 402 (FIG. 10) as in the sixth embodiment. Furthermore, the second cores 28 and 29 may be formed of materials different from each other as in the fourth embodiment.

The first core 10G is formed of electromagnetic steel sheets, for example, and the second cores 28 and 29 are formed of amorphous metal or nanocrystal metal. However, the second cores 28 may be formed of amorphous metal or nanocrystal metal and the second core 29 may be formed of material having higher strength (for example, electromagnetic steel sheets).

The rest of the configuration of the stator and the configuration of the rotor in the eighth embodiment are similar to those in the first embodiment. The motor 300 (see FIG. 1)

including the stator and the rotor in the eighth embodiment is employed for the rotary compressor 500 (see FIG. 16), for example.

As described above, in this eighth embodiment, a plurality of second cores 28 are arranged in the circumferential direction in the tooth 3G and the separation wall 35 is disposed between the second cores 28. Accordingly, the rigidity of the stator core 1G, especially, the rigidity against the deformation of the teeth 3G in the circumferential direction can be increased, and vibration and noise can be inhibited.

Further, the thickness of the separation wall 35 is within the range of 0.2 mm to 1 mm, and thus most of the magnetic flux flowing into the tooth 3G flows through the second cores 28. Therefore, the iron loss can be reduced.

Incidentally, the second cores 28 and 29 are not limited to amorphous metal or nanocrystal metal, but any material having lower iron loss than the first core 10G may be used. Further, the first core 10G may be formed of any material having higher strength than the second cores 28 and 29.

(Configuration of Insulator)

Figure 13:
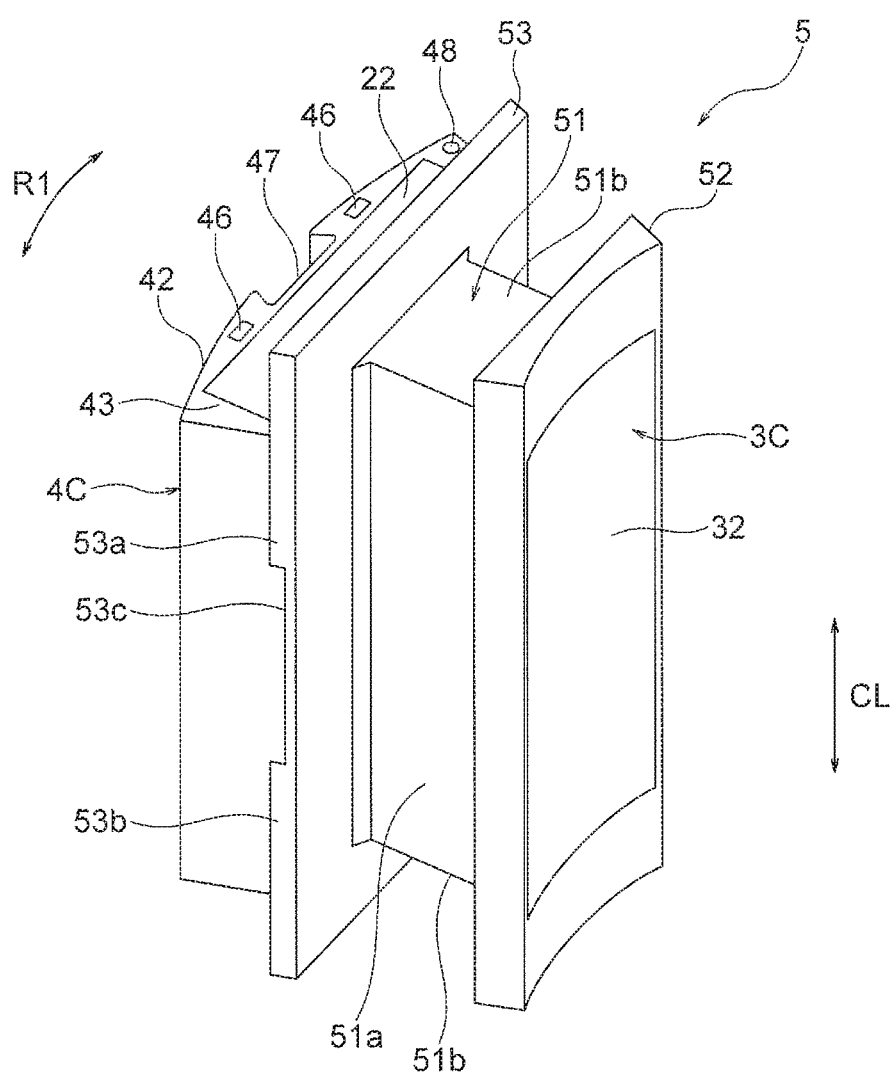
FIG. 13 is a perspective view showing a configuration example of an insulator.

Next, a configuration of the insulator 5 attached to the stator core will be described with reference to FIG. 13. Description will be given by taking the insulator 5 attached to the stator core 1C (FIG. 8) in the fourth embodiment as an example.

The insulator 5 includes a winding part 51 disposed so as to surround the tooth 3C. The winding part 51 includes a pair of wall parts 51a disposed on both sides of the tooth 3C in the circumferential direction (i.e., facing the pair of side walls 31) and a pair of wall parts 51b disposed on both sides of the tooth 3C in the axial direction. The winding 2 is wound around this winding part 51.

A first flange part 52 is formed at an end of the winding part 51 on the inner side in the radial direction (the axis line CL side), and is arranged to surround the tooth tip part 32. The first flange part 52 extends from the tooth tip part 32 toward both sides in the circumferential direction and both sides in the axial direction. The first flange part 52 serves as a guide on the inner side in the radial direction for the winding 2 wound around the winding part 51.

A second flange part 53 is formed at an end of the winding part 51 on the outer side in the radial direction (the side opposite to the axis line CL), and the second flange part 53 is parallel with the first flange part 52. The second flange part 53 covers the inner-side end surface 25a of the second core 25 of the yoke 4C (FIG. 8) and further extends toward both sides in the circumferential direction and both sides in the axial direction. The second flange part 53 serves as a guide on the outer side in the radial direction for the winding 2 wound around the winding part 51.

FIG. 14(A) is a side view of the insulator 5 as viewed from the side. FIG. 14(B) is a cross-sectional view of the insulator 5 as viewed in a direction shown by arrows 14B in FIG. 14(A). As shown in FIG. 14(A), around the winding part 51, a winding region for the winding 2 is formed between the first flange part 52 and the second flange part 53.

Convex parts 53a and 53b fitting in the opening parts 41j and 41k (FIG. 8) of the yoke 4C and concave parts 53c fitting on the inner circumferential wall parts 41i (FIG. 8) of the yoke 4C are formed on a surface of the second flange part 53 on the outer side in the radial direction (the yoke 4C side). Further, as shown in FIG. 14(B), convex parts 51c and 51d fitting in the opening parts 31j and 31k (FIG. 8) of the tooth 3C and concave parts 51e fitting on the side wall parts 31i (FIG. 8) are formed on an inner surface of each wall part 51a of the winding part 51.

Since the insulator 5 includes the convex parts 51c and 51d (insulation parts) fitting in the opening parts 31j and 31k of the tooth 3C and the convex parts 53a and 53b (insulation parts) fitting in the opening parts 41j and 41k of the yoke 4C as described above, the second cores 24 and 25 can be held firmly. Namely, it is possible to prevent shaking and inhibit occurrence of vibration and noise.

The insulator 5 can be formed by, for example, setting the stator core 1C in a cavity of an injection molding machine and injecting resin into a space around the stator core 1C. Further, it is possible to split the insulator 5 into two parts in the axial direction and fit the split parts onto the stator core 1C from both sides in the axial direction.

While this description has been given of the insulator 5 attached to the stator core 1C in the fourth embodiment, insulators attached to the stator cores in the first to third and fifth to eighth embodiments can also be formed in conformity with the shapes of the corresponding stator cores.

(Modification)

While the second core is disposed in both of the tooth and the yoke in the first through eighth embodiments described above, it is also possible to dispose the second core in only one of the tooth and the yoke.

Figure 15:
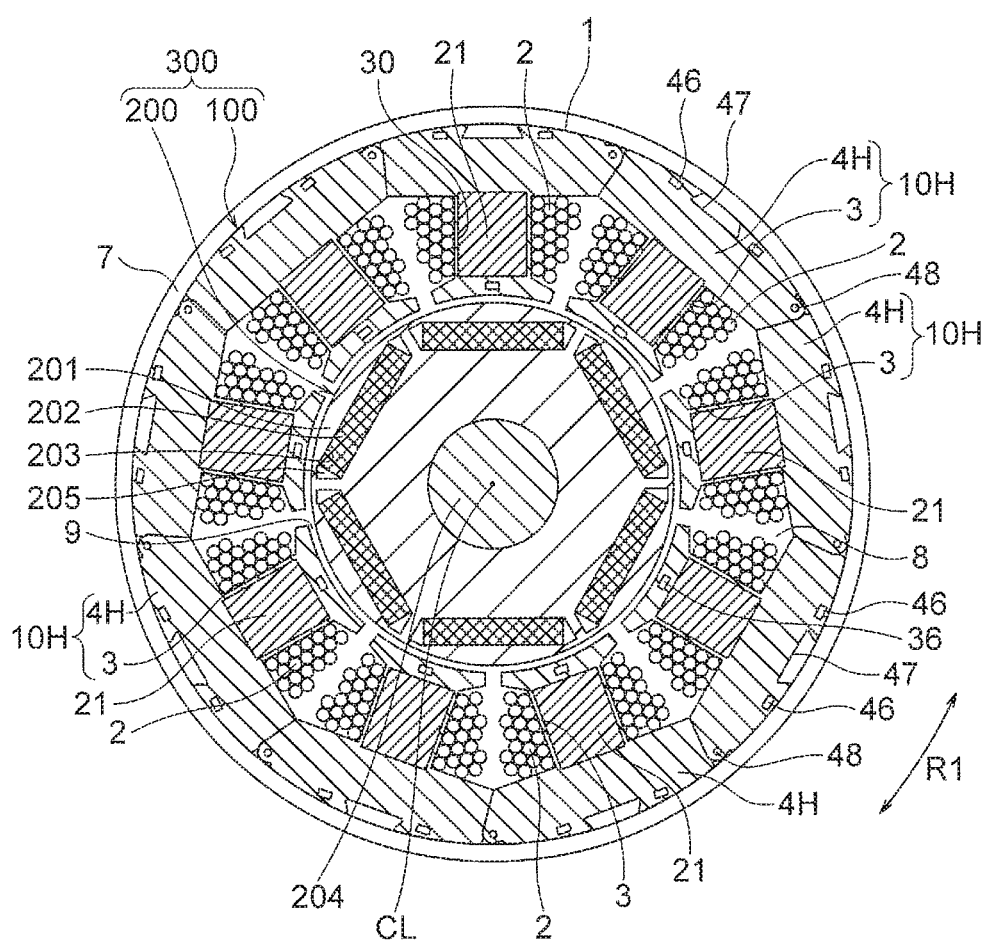
FIG. 15 is a cross-sectional view showing a configuration of a motor according to a modification.

FIG. 15 is a cross-sectional view showing a motor 300 according to a modification of the first through eighth embodiments. In the motor 300 shown in FIG. 15, a second core 21 is provided in a tooth 3 of a first core 10H but is not provided in a yoke 4H of the first core 10H. Namely, the tooth 3 has the insertion hole 30 in which the second core 21 is inserted, but the yoke 4H does not have the insertion hole 40 (FIG. 2).

The first core 10H is formed of electromagnetic steel sheets, for example, and the second core 21 is formed of amorphous metal or nanocrystal metal, for example. However, the second core 21 is not limited to amorphous metal or nanocrystal metal, but any material having as low iron loss as possible may be used. The first core 10H may be formed of any material having higher strength than the second core 21.

Also in the configuration shown in FIG. 15, most of the magnetic flux flowing into the tooth 3 flows through the second core 21, and thus the iron loss can be reduced. Further, since the second core 21 is surrounded by the first core 10H having high strength, the compressive stress applied to the second core 21 can be reduced and the increase in magnetic resistance due to the compressive stress can be inhibited.

(Rotary Compressor)

Figure 16:
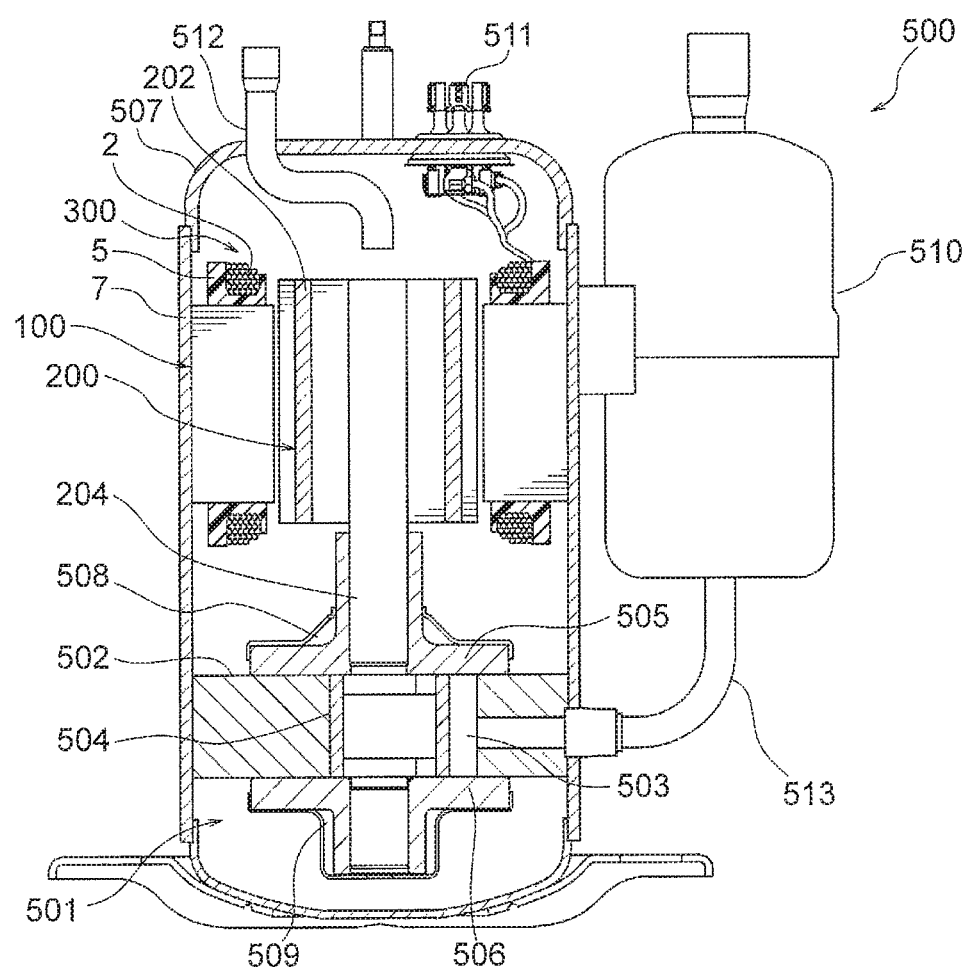
FIG. 16 is a cross-sectional view showing a configuration of a rotary compressor to which the motor of each of the embodiments is applied.

Next, the rotary compressor 500 to which the motors 300 of the first through eighth embodiments can be applied will be described. FIG. 16 is a cross-sectional view showing a configuration of the rotary compressor 500. The rotary compressor 500 includes a hermetic container 507, a compression element 501 provided in the hermetic container 507, and the motor 300 driving the compression element 501.

The compression element 501 includes a cylinder 502 having a cylinder chamber 503, a shaft 204 (FIG. 1) rotated by the motor 300, a rolling piston 504 fixed to the shaft 204, a vane (not shown in the figure) separating the inside of the cylinder chamber 503 into an intake side and a compression side, and an upper frame 505 and a lower frame 506 in which the shaft 204 is inserted and which close end faces of the cylinder chamber 503 in the axial direction. An upper discharge muffler 508 and a lower discharge muffler 509 are respectively attached to the upper frame 505 and the lower frame 506.

The hermetic container 507 is a cylindrical container formed by drawing of a steel sheet having a thickness of 3 mm, for example. Refrigerator oil (not shown in the figure) for lubricating sliding parts of the compression element 501 is stored in a bottom part of the hermetic container 507. The shaft 204 is rotatably held by the upper frame 505 and the lower frame 506 serving as shaft bearing parts.

The cylinder 502 has the cylinder chamber 503 therein. The rolling piston 504 rotates eccentrically in the cylinder chamber 503. The shaft 204 has an eccentric shaft part, and the rolling piston 504 is fit on the eccentric shaft part.

The hermetic container 507 includes the cylindrical frame 7. The stator 100 of the motor 300 is mounted inside the frame 7 by means of shrink fitting, welding or the like. To the windings 2 of the stator 100, electric power is supplied from a glass terminal 511 fixed to the hermetic container 507. The shaft 204 is fixed in a shaft hole formed at the center of the rotor core 201 (FIG. 1) of the rotor 200.

An accumulator 510 storing refrigerant gas is attached to an outside of the hermetic container 507. An intake pipe 513 is fixed to the hermetic container 507, and the refrigerant gas is supplied from the accumulator 510 to the cylinder 502 via the intake pipe 513. A discharge pipe 512 for discharging the refrigerant to the outside is provided at an upper part of the hermetic container 507.

As the refrigerant, R410A, R407C, R22 or the like is usable, for example. From the viewpoint of preventing global warming, it is preferable to use a refrigerant with low GWP (Global Warming Potential).

An operation of the rotary compressor 500 is as follows. The refrigerant gas from the accumulator 510 is supplied to the inside of the cylinder chamber 503 of the cylinder 502 through the intake pipe 513. When the motor 300 is driven by energizing an inverter and the rotor 200 is rotated by the motor 300, the shaft 204 rotates together with the rotor 200. Then, the rolling piston 504 fitted on the shaft 204 rotates eccentrically in the cylinder chamber 503 and the refrigerant is compressed in the cylinder chamber 503. The refrigerant compressed in the cylinder chamber 503 passes through the discharge mufflers 508 and 509, further passes through holes (not shown in the figure) formed through the rotor core 201, and ascends in the hermetic container 507. The refrigerant after ascending in the hermetic container 507 is discharged through the discharge pipe 512 and supplied to a high-pressure side of a refrigeration cycle.

Incidentally, while the refrigerator oil is mixed into the refrigerant compressed in the cylinder chamber 503, the passage of the refrigerant through the holes formed through the rotor core 201 promotes separation between the refrigerant and the refrigerator oil and prevents the refrigerator oil from flowing into the discharge pipe 512.

The motor 300 described in each of the embodiments is applicable to this rotary compressor 500, and the motor 300 has low iron loss and sufficient strength. Accordingly, energy efficiency and reliability of the rotary compressor 500 can be enhanced.

Incidentally, the motors 300 described in the first through eighth embodiments can be employed not only for the rotary compressor 500 but also for other types of compressors.

(Refrigeration Air Conditioner)

Figure 17:
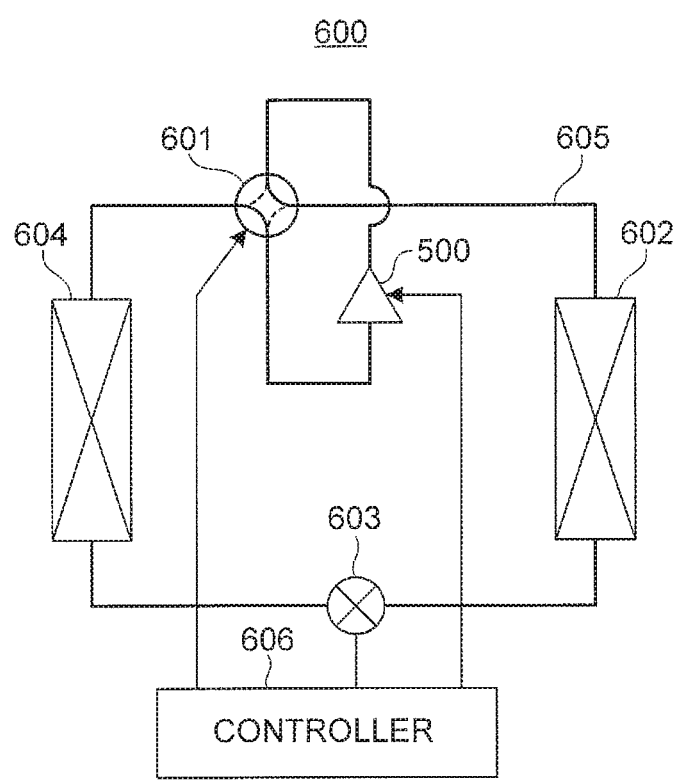
FIG. 17 is a diagram showing a configuration of a refrigeration air conditioner including the rotary compressor of FIG. 16.

Next, a refrigeration air conditioner 600 including the above described rotary compressor 500 will be described. FIG. 17 is a diagram showing a configuration of the refrigeration air conditioner 600. The refrigeration air conditioner 600 shown in FIG. 17 includes the compressor (rotary compressor) 500, a four-way valve 601, a condenser 602, a decompressor (expander) 603, an evaporator 604, a refrigerant pipe 605, and a controller 606. The compressor 500, the condenser 602, the decompressor 603 and the evaporator 604 are connected by the refrigerant pipe 605 to form a refrigeration cycle.

An operation of the refrigeration air conditioner 600 is as follows. The compressor 500 compresses the refrigerant taken in and sends out the refrigerant as a high-temperature and high-pressure gas refrigerant. The four-way valve 601 is a valve for switching a flow direction of the refrigerant. In the state shown in FIG. 17, the four-way valve 601 directs the refrigerant sent out from the compressor 500 to the condenser 602. The condenser 602 performs heat exchange between the refrigerant sent out from the compressor 500 and air (for example, outdoor air), thereby condenses and liquefies the refrigerant, and sends out the liquid refrigerant. The decompressor 603 expands the liquid refrigerant sent out from the condenser 602 and sends out the refrigerant as a low-temperature and low-pressure liquid refrigerant.

The evaporator 604 performs heat exchange between the low-temperature and low-pressure liquid refrigerant sent out from the decompressor 603 and air (for example, indoor air), evaporates (gasifies) the refrigerant by making the refrigerant take away heat from the air, and sends out the refrigerant as a gas refrigerant. The air deprived of heat in the evaporator 604 is supplied to an object space (for example, inside of a room) by a blower not shown in the figure. Incidentally, the operation of the four-way valve 601 and the compressor 500 is controlled by the controller 606.

The motor 300 described in each of the embodiments is applicable to the compressor 500 of the refrigeration air conditioner 600, and the motor 300 has low iron loss and sufficient strength. Accordingly, energy efficiency and reliability of the refrigeration air conditioner 600 can be enhanced.

Incidentally, components of the refrigeration air conditioner 600 other than the compressor 500 are not limited to the configuration example described above.

While preferred embodiments of the present invention have been described specifically above, the present invention is not limited to the above described embodiments and a variety of improvements or modifications can be made within the range not departing from the subject matter of the present invention.

What is claimed is:

1. A stator comprising:
   a first core having a yoke extending in a circumferential direction about an axis line and having a second insertion hole, and a tooth extending from the yoke in a direction toward the axis line and having a first insertion hole; and
   a second core having a first part disposed in the first insertion hole and a second part disposed in the second insertion hole, the second core being formed of amorphous metal or nanocrystal metal, wherein
   the tooth has a side wall on each side of the first insertion hole in the circumferential direction, and the side wall has a first opening part through which the first part of the second core is exposed.

2. The stator according to claim 1, wherein
   a length of the first insertion hole in the circumferential direction is shorter than a length of the first insertion hole in a direction perpendicular to the circumferential direction in a plane perpendicular to the axis line, and
   a length of the second insertion hole in the circumferential direction is longer than a length of the second insertion hole in the direction perpendicular to the circumferential direction in the plane perpendicular to the axis line.

3. The stator according to claim 1, wherein the first opening part is formed in a central part of the side wall in a direction of the axis line.

4. The stator according to claim 1, wherein the first opening part is formed at each end of the side wall in a direction of the axis line.

5. The stator according to claim 1, further comprising an insulation part disposed in the first opening part.

6. The stator according to claim 1, wherein the first core has a partition wall between the first insertion hole and the second insertion hole.

7. The stator according to claim 6, wherein
the first insertion hole is separated in the circumferential direction into a plurality of parts, and
the first core has a separation wall separating the plurality of parts of the first insertion hole from each other.

8. The stator according to claim 1, wherein the second insertion hole has a shape obtained by chamfering or curving four corners of a quadrangle in a plane perpendicular to the axis line.

9. The stator according to claim 1, wherein the first insertion hole and the second insertion hole are formed continuously.

10. The stator according to claim 9, wherein the first part and the second part of the second core are formed integrally.

11. The stator according to claim 9, wherein
the first part of the second core extends from the first insertion hole into an inside of the second insertion hole, and
the second part of the second core is disposed adjacent to the first part of the second core in the circumferential direction in the second insertion hole.

12. The stator according to claim 1, wherein the first part and the second part of the second core are provided separately from each other.

13. The stator according to claim 12, wherein the first part and the second part of the second core are formed of materials different from each other.

14. The stator according to claim 1, wherein the first core is formed of a layered body in which a plurality of electromagnetic steel sheets are stacked.

15. The stator according to claim 14, wherein
each of the tooth and the yoke has a crimping part, and
the plurality of electromagnetic steel sheets are fixed together by the crimping part of the tooth and the crimping part of the yoke.

16. The stator according to claim 1, wherein
the second core is formed of a layered body in which a plurality of thin strips are stacked, and
a thickness of each of the plurality of thin strips is 0.02 mm to 0.05 mm.

17. The stator according to claim 16, wherein an adhesive agent exists between the plurality of thin strips.

18. The stator according to claim 16, wherein
the plurality of thin strips are thin strips of amorphous metal, and
the second core is obtained by annealing the layered body of the plurality of thin strips.

19. The stator according to claim 1, wherein the second core is formed of a molded body of powder.

20. A motor comprising the stator according to claim 1, and a rotor provided inside the stator.

21. The motor according to claim 20, further comprising a cylindrical frame in which the stator is fit.

22. A compressor comprising a motor and a compression element driven by the motor, wherein the motor comprises the stator according to claim 1 and a rotor provided inside the stator.

23. A refrigeration air conditioner comprising the compressor according to claim 22, a condenser, a decompressor and an evaporator.

24. A stator comprising:
a first core having a yoke extending in a circumferential direction about an axis line and having a second insertion hole, and a tooth extending from the yoke in a direction toward the axis line and having a first insertion hole; and
a second core having a first part disposed in the first insertion hole and a second part disposed in the second insertion hole, the second core being formed of amorphous metal or nanocrystal metal, wherein
the yoke has an inner circumferential wall on the axis line side of the second insertion hole, and the inner circumferential wall has a second opening part through which the second part of the second core is exposed.

25. The stator according to claim 24, wherein the second opening part is formed in a central part of the inner circumferential wall in a direction of the axis line.

26. The stator according to claim 24, wherein the second opening part is formed at each end of the inner circumferential wall in a direction of the axis line.

27. The stator according to claim 24, further comprising an insulation part disposed in the second opening part.

28. The stator according to claim 24, wherein the yoke has an outer circumferential wall thicker than the inner circumferential wall and located on a side opposite to the inner circumferential wall across the second insertion hole.

29. A motor comprising the stator according to claim 24 and a rotor provided inside the stator.

30. A compressor comprising a motor and a compression element driven by the motor, wherein the motor comprises the stator according to claim 24 and a rotor provided inside the stator.

31. A refrigeration air conditioner comprising the compressor according to claim 30, a condenser, a decompressor, and an evaporator.

* * * * *